United States Patent
Ito et al.

(10) Patent No.: US 11,902,005 B2
(45) Date of Patent: Feb. 13, 2024

(54) RELAY APPARATUS AND RELAY METHOD

(71) Applicant: NIPPON TELEGRAPH AND TELEPHONE CORPORATION, Tokyo (JP)

(72) Inventors: Kota Ito, Musashino (JP); Yushi Shirato, Musashino (JP); Naoki Kita, Musashino (JP); Takeshi Onizawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 47 days.

(21) Appl. No.: 17/630,040

(22) PCT Filed: Aug. 1, 2019

(86) PCT No.: PCT/JP2019/030204
§ 371 (c)(1),
(2) Date: Jan. 25, 2022

(87) PCT Pub. No.: WO2021/019759
PCT Pub. Date: Feb. 4, 2021

(65) Prior Publication Data
US 2022/0278739 A1 Sep. 1, 2022

(51) Int. Cl.
*H04B 7/26* (2006.01)
*H04B 7/145* (2006.01)
*H01Q 3/34* (2006.01)

(52) U.S. Cl.
CPC ............ *H04B 7/145* (2013.01); *H01Q 3/34* (2013.01)

(58) Field of Classification Search
CPC ...... H04B 7/145; H04B 7/155; H01Q 3/2605; H01Q 3/2647; H01Q 3/34; H01Q 3/46;
(Continued)

(56) References Cited

U.S. PATENT DOCUMENTS 2,908,002 A    10/1959  Van Atta
3,611,400 A *  10/1971  Nagai ................. H01Q 3/26
                                                     342/371
(Continued)

FOREIGN PATENT DOCUMENTS

JP    S492499 B1     1/1974
JP    2002135185 A   5/2002

OTHER PUBLICATIONS

Paris Ang and George V. Eleftheriades, "A Passive Redirecting Van Atta-Type Reflector", IEEE Antennas and Wireless Propagation Letters, vol. 17, No. 4, 2018, pp. 689-692.

*Primary Examiner* — Frank Duong
(74) *Attorney, Agent, or Firm* — Harness, Dickey & Pierce, P.L.C.

(57) ABSTRACT

Using an array antenna in which a spacing between adjacent antenna elements is constant, each of combinations of two antenna elements in positions symmetrical relative to a center of an array is connected by wire connections in two paths, and a path length between the antenna elements in the combination of two antenna elements is the same in all of the combinations: a phase adjustment amount is calculated for each wire connection aside from a reference wire connection on the basis of an arrival direction of a wireless signal received by one antenna element in the combination of two antenna elements and a re-radiation direction of a wireless signal transmitted as a re-radiated wave by the other antenna element corresponding to the one antenna element, taking into account a phase difference between a signal transmitted by the wire connections connected to the one antenna element and a signal transmitted by the reference wire connection; and phase rotation is applied to the signal
(Continued)

transmitted by the wire connections aside from the reference wire connection in accordance with the calculated phase adjustment amount.

5 Claims, 16 Drawing Sheets

(58) Field of Classification Search
CPC ........ H01Q 15/14; H01Q 21/06; H01Q 23/00; G06K 19/07773
See application file for complete search history.

(56) References Cited

U.S. PATENT DOCUMENTS

| | | | | |
|---|---|---|---|---|
| 3,731,313 | A * | 5/1973 | Nagai | H01Q 3/46 |
| | | | | 343/893 |
| 11,152,698 | B2 * | 10/2021 | Kirknes | H01Q 3/2647 |
| 2002/0061051 | A1 * | 5/2002 | Kitahara | H04B 7/0617 |
| | | | | 375/144 |
| 2012/0182176 | A1 * | 7/2012 | Maunder | G01S 7/40 |
| | | | | 343/834 |

* cited by examiner

RELAY APPARATUS AND RELAY METHOD

CROSS-REFERENCE TO RELATED APPLICATIONS

This application is a 371 U.S. National Phase of International Application No. PCT/JP2019/030204, filed on Aug. 1, 2019. The entire disclosure of the above application is incorporated herein by reference.

TECHNICAL FIELD

The present invention relates to a relay device that relays radio waves and a relay method.

BACKGROUND ART

The Van Atta array is known as one of the simplest structures of antennas that can re-radiate radio waves in the direction from which the radio waves arrived (see, for example, PTL 1). A Van Atta array includes an even number of antenna elements disposed at equal intervals and connected so that path lengths of the paths connecting the antenna elements to each other at positions symmetrical with respect to the center of the array are the same length.

FIG. 14 is a diagram illustrating the configuration of a four-element Van Atta array. In the four-element Van Atta array, an antenna element 101-1 and an antenna element 101-4 are at positions symmetrical with respect to the center of the array, and an antenna element 101-2 and an antenna element 101-3 are at positions symmetrical with respect to the center of the array. In FIG. 14, a connection point between the antenna element 101-1 and a wire connection is P101-1, a connection point between the antenna element 101-2 and the wire connection is P101-2, a connection point between the antenna element 101-3 and the wire connection is P101-3, and a connection point between the antenna element 101-4 and the wire connection is P101-4. Assume that a length from the connection point P101-1 to the connection point P101-4 is L. In this case, the length from the connection point P101-2 to the connection point P101-3 will also be L.

Assume now that a plane wave of a wireless signal arrives at the Van Atta array from, for example, the upper-right diagonal, as illustrated in FIG. 14. At this time, the plane wave arrives at the antenna elements 101-4, 101-3, 101-2, and 101-1 in that order. Each of the wireless signals received by the antenna elements 101-4, 101-3, 101-2, and 101-1 is transmitted as an electrical signal by the wire connection. After the time required for transmission by the wire connection has passed, each of the antenna elements 101-1, 101-2, 101-3, and 101-4 re-radiates the signal transmitted by the wire connection in the order of the antenna elements 101-1, 101-2, 101-3, and 101-4.

At this time, the re-radiated waves strengthen each other in-phase with the arrival direction of the plane wave. Although FIG. 14 illustrates an example of a linear array, a planar array can also be realized in the same way.

NPL 1 discloses a technique for controlling the direction of re-radiated waves of a Van Atta array. FIG. 15 is a block diagram illustrating the configuration of a relay device 100 including a four-element Van Atta array based on the principles disclosed in NPL 1. Each of the combinations of antenna elements 101-1 and 101-4 and the combinations of antenna elements 101-2 and 101-3 are connected such that the path lengths are equal path lengths L.

In the relay device 100, each of circulators 110-1 to 110-4 includes three connection terminals. Each of the circulators 110-1 to 110-4 outputs a signal taken in at one of the connection terminals to the connection terminal located next in the clockwise direction. Each of the combination of the circulators 110-1 and 110-4 and the combination of the circulators 110-2 and 110-3 are connected by two paths having directionality.

The circulator 110-1 is connected to two paths, namely wire connections 120-1 and 120-2L. The circulator 110-4 is connected to two paths, namely wire connections 120-1 and 120-2R. A phase adjustment unit 130-3, which applies phase rotation to the signal, is provided between the wire connection 120-2L and the wire connection 120-2R. In the following, the wire connections 120-2L and 120-2R will be referred to as a wire connection 120-2 when indicated together.

The circulator 110-2 is connected to two paths, namely a wire connection 120-3L and a wire connection 120-4L. The circulator 110-3 is connected to two paths, namely a wire connection 120-3R and a wire connection 120-4R. A phase adjustment unit 130-1 is provided between the wire connection 120-3L and the wire connection 120-3R, and a phase adjustment unit 130-2 is provided between the wire connection 120-4L and the wire connection 120-4R. In the following, the wire connections 120-3L and 120-3R will be referred to as a wire connection 120-3 when indicated together, and the wire connections 120-4L and 120-4R will be referred to as a wire connection 120-4 when indicated together.

Assume that the distance of a path from the connection point P101-1 between the antenna element 101-1 and a wire connection 150-1 to the connection point P101-4 between the antenna element 101-4 and a wire connection 150-4, via a wire connection 150-1, the circulator 110-1, the wire connection 120-1, the circulator 110-4, and wire connection 150-4, is L. At this time, the distance of the path in the reverse direction, from the connection point P101-4 to the connection point P101-1 via the wire connection 150-4, the circulator 110-4, the wire connection 120-2R, the phase adjustment unit 130-3, the wire connection 120-2L, the circulator 110-1, and the wire connection 150-1, is also L.

Likewise, the distance of a path from the connection point P101-2 between the antenna element 101-2 and a wire connection 150-2 to the connection point P101-3 between the antenna element 101-3 and a wire connection 150-3, via a wire connection 150-2, the circulator 110-2, the wire connection 120-3L, the phase adjustment unit 130-1, the wire connection 120-3R, the circulator 110-3, and the wire connection 150-3, is also L. The distance of the path in the reverse direction, from the connection point P101-3 to the connection point P101-2 via the wire connection 150-3, the circulator 110-3, the wire connection 120-4R, the phase adjustment unit 130-2, the wire connection 120-4L, the circulator 110-2, and the wire connection 150-2, is also L.

The phase adjustment unit 130-1 applies a phase rotation of $\delta$ to the signal transmitted by the wire connection 120-3L. The phase adjustment unit 130-2 applies a phase rotation of $2\delta$ to the signal transmitted by the wire connection 120-4R. The phase adjustment unit 130-3 applies a phase rotation of $3\delta$ to the signal transmitted by the wire connection 120-2R. Accordingly, in the example illustrated in FIG. 15, no phase adjustment is performed at the wire connection 120-1 from the antenna element 101-1 to the antenna element 101-4. A phase rotation of $\delta$ is applied at the wire connection 120-3L from the antenna element 101-2 to the antenna element 101-3. A phase rotation of $2\delta$ is applied at the wire connection 120-4R from the antenna element 101-3 to the antenna element 101-2. A phase rotation of 3δ is applied at the wire connection 120-2R from the antenna element 101-4 to the antenna element 101-1.

Assume, as illustrated in FIG. 15, that a wireless signal radio wave arrives from a direction ψ. At this time, the phases of the arriving waves arriving at the antenna elements 101-1, 101-2, 101-3, and 101-4 are 0, τ, 2τ, and 3τ, respectively. Here, τ is indicated by the following Equation (1).

[Math. 1]
$$\tau = \frac{2\pi d}{\lambda}\sin\psi \quad (1)$$

In Equation (1), d is the spacing between adjacent antenna elements. In Equation (1), λ is the wavelength of the arriving wave.

The arriving wave received by each of the antenna elements 101-1, 101-2, 101-3, and 101-4 is transmitted as an electrical signal by the wire connections 150-1 to 150-4 and the wire connections 120-1 to 120-4 connected thereto. During the transmission, the phase adjustment units 130-1 to 130-3 apply the phase rotation amounts δ, 2δ, and 3δ to the signal, respectively, and the antenna elements 101-4, 101-3, 101-2, and 101-1 radiate again.

At this time, the phases of the wireless signal radio waves that are re-radiated by the antenna elements 101-1, 101-2, 101-3, and 101-4 are indicated by Equation (2) to Equation (5), respectively, which are indicated below.

[Math. 2]
$$3(\delta + \tau) + \frac{2\pi L}{\lambda} \quad (2)$$

[Math. 3]
$$2(\delta + \tau) + \frac{2\pi L}{\lambda} \quad (3)$$

[Math. 4]
$$\delta + \tau + \frac{2\pi L}{\lambda} \quad (4)$$

[Math. 5]
$$\frac{2\pi L}{\lambda} \quad (5)$$

As indicated in Equation (2) to Equation (5), the phase difference between adjacent antenna elements is constant at δ+τ. In this case, the re-radiated wave is emitted in a direction θ, which satisfies the condition indicated in the following Equation (6).

[Math. 6]
$$\frac{2\pi d}{\lambda}\sin\theta = \delta + \tau \quad (6)$$

Accordingly, if δ is expressed by the following Equation (7), the re-radiation direction θ can be expressed by the following Equation (8).

[Math. 7]
$$\delta = \frac{2\pi d}{\lambda}(\sin\theta - \sin\psi) \quad (7)$$

[Math. 8]
$$\arcsin(\sin\psi + \sin\theta - \sin\psi) = \theta \quad (8)$$

This makes it possible for the arriving wave from the direction ψ to be re-radiated in the direction θ, and makes it possible to radiate the re-radiated waves in a direction different from the arrival direction.

Communication volumes have been rising in recent years. Using high-frequency bands is essential for increasing communication volumes. However, in a high-frequency band, radio waves have stronger directness, and cannot adequately reach hidden areas blocked by structures and trees, which may cause a drop in communication quality. It is therefore expected that wireless relay to the hidden areas will be necessary.

Directional-control Van Atta arrays, such as that disclosed in NPL 1, show promise for applications in wireless relay to hidden areas. FIG. 16 illustrates the use of a direction-control Van Atta array as a relay device 100 for a hidden area. For a terminal device 200 which is surrounded by structures 301 and 302 that make it difficult for radio waves to reach, for example, wireless relay is performed by installing a relay device 100 on top of the structure 302, and radio waves arriving at the relay device 100 are re-radiated so as to arrive at the terminal device 200. FIG. 16 illustrates an example of wireless relay to the terminal device 200 by re-radiating arriving waves from the direction ψ to the direction θ.

CITATION LIST

Patent Literature

[PTL 1] U.S. Pat. No. 2,908,002A

Non Patent Literature

[NPL 1] Paris Ang, and George V. Eleftheriades, "A Passive Redirecting Van Atta-Type Reflector", IEEE Antennas and Wireless Propagation Letters, Vol. 17, No. 4, April 2018, pp 689-692.

SUMMARY OF THE INVENTION

Technical Problem

The direction-control Van Atta array disclosed in NPL 1 requires that the arrival direction and re-radiation direction of radio waves be fixed. For example, in FIG. 15, when δ in the phase rotations δ, 2δ, and 3δ applied by the phase adjustment units 130-1, 130-2, and 130-2 satisfies the condition in Equation (7), i.e., the arrival direction ψ and the re-radiation direction θ are set, there is a problem in that if the direction of the arriving wave becomes ψ'(≠ψ), the direction of the re-radiated wave does not become el as indicated in the following Equation (9), and the re-radiated wave is therefore not radiated in the direction θ.

[Math. 9]
$$\arcsin(\sin\psi' + \sin\theta - \sin\psi) \neq \theta \quad (9)$$

Additionally, δ in the phase rotation amounts δ, 2δ, and 3δ applied by the phase adjustment units 130-1, 130-2, and 130-2 is fixed, and the phase rotation amount cannot be changed dynamically. There is thus a problem in that the direction-control Van Atta array disclosed in NPL 1 can be applied when the arrival direction ψ and the re-radiation direction θ of radio waves are fixed in advance, but cannot be applied when these directions are not fixed.

Additionally, the direction-control Van Atta array disclosed in NPL 1 cannot reverse the arrival direction and the re-radiation direction. For example, in FIG. 15, when δ0 in the phase rotation amounts δ, 2δ, and 3δ applied by the phase adjustment units 130-1, 130-2, and 130-2 satisfies the condition in Equation (7), i.e., the arrival direction ψ and the re-radiation direction θ are set, if the direction of the arriving wave becomes θ(≠ψ), the direction of the re-radiated wave does not become ψ as indicated in the following Equation (10).

[Math. 10]

$$\arcsin(\sin\theta + \sin\theta - \sin\psi) \neq \psi \tag{10}$$

In other words, when the arrival direction ψ and the re-radiation direction θ are set, there is a problem in that the arriving wave from the direction θ is not re-radiated in the direction ψ.

Furthermore, the direction-control Van Atta array disclosed in NPL 1 requires that the frequency of the radio waves, i.e., the wavelength, be fixed. For example, in FIG. 15, when δ in the phase rotation amounts δ, 2δ, and 3δ applied by the phase adjustment units 130-1, 130-2, and 130-2 satisfies the condition in Equation (7), i.e., the arrival direction ψ and the re-radiation direction θ are set with respect to radio waves of a wavelength λ, if the wavelength of the arriving wave becomes λ'(≠λ), the re-radiation direction does not become θ as indicated in the following Equation (11).

[Math. 11]

$$\arcsin\left\{\frac{\lambda'}{\lambda}\sin\theta + \left(1 - \frac{\lambda'}{\lambda}\right)\sin\psi\right\} \neq \theta \tag{11}$$

There is thus a problem in that the direction-control Van Atta array disclosed in NPL 1 can be applied when the wavelength of the radio wave is fixed, but cannot be applied when the wavelength is not fixed.

In view of the foregoing situation, an object of the present invention is to provide a technique that can radiate wireless signal radio waves arriving from any arrival direction to any re-radiation direction using an array antenna.

Means for Solving the Problem

One aspect of the present invention is a relay device including: an array antenna in which a spacing between adjacent ones of antenna elements is constant, each of combinations of two of the antenna elements in positions symmetrical relative to a center of an array is connected by wire connections in two paths, and a path length between the antenna elements in the combination of two antenna elements is the same in all of the combinations; a phase control unit that, when any one of the wire connections is predefined as a reference wire connection serving as a reference, calculates a phase adjustment amount for each of the wire connections aside from the reference wire connection on the basis of an arrival direction of a wireless signal received by one of the antenna elements in the combination of two antenna elements and a re-radiation direction of a wireless signal transmitted as a re-radiated wave by another of the antenna elements corresponding to the one of the antenna elements, taking into account a phase difference between a signal transmitted by the wire connections connected to the one of the antenna elements and a signal transmitted by the reference wire connection; and a phase adjustment unit, provided for each of the wire connections aside from the reference wire connection, that applies phase rotation to the signal transmitted by the wire connection in accordance with the phase adjustment amount calculated by the phase control unit.

One aspect of the present invention is the above-described relay device, wherein the wireless signal contains a plurality of frames that are time-divided; the phase control unit calculates, for each of the wire connections aside from the reference wire connection, the phase adjustment amount for each of the frames contained in the wireless signal received by the one of the antenna elements, on the basis of an arrival direction of the wireless signal containing the frame and a re-radiation direction of the wireless signal containing the frame, taking into account the phase difference between the signal transmitted by the wire connections connected to the one of the antenna elements and the signal transmitted by the reference wire connection; and the phase adjustment unit detects the frame from the signal transmitted by the wire connection, and applies phase rotation to the phase of the detected frame in accordance with the phase adjustment amount corresponding to the detected frame.

One aspect of the present invention is the above-described relay device, wherein the frame contains data indicating a source or data indicating a destination, and the phase control unit calculates a re-radiation direction of the wireless signal containing the frame on the basis of the data indicating the source or the data indicating the destination contained in the frame.

One aspect of the present invention is the above-described relay device, wherein the wireless signal is transmitted at a plurality of wavelengths; the phase control unit calculates, for each of the wire connections aside from the reference wire connection, the phase adjustment amount for each of different wavelengths received by the one of the antenna elements on the basis of an arrival direction of the wireless signal of the wavelength and a re-radiation direction of a wireless signal of the wavelength transmitted as a re-radiated wave by the other of the antenna elements, taking into account a phase difference between signals of the wavelength transmitted by the wire connections connected to the one of the antenna elements and a signal of the wavelength transmitted by the reference wire connection; and the phase adjustment unit separates the signals transmitted by the wire connections into each of the wavelengths, and applies phase rotation to the phase of the signal of each of the wavelength obtained by the separating, in accordance with the phase adjustment amount corresponding to each of the wavelengths.

One aspect of the present invention is a relay method using an array antenna in which a spacing between adjacent ones of antenna elements is constant, each of combinations of two of the antenna elements in positions symmetrical relative to a center of an array is connected by wire connections in two paths, and a path length between the antenna elements in the combination of two antenna elements is the same in all of the combinations. The method includes: a phase adjustment amount calculation step of, when any one of the wire connections is predefined as a reference wire connection serving as a reference, calculating a phase adjustment amount for each of the wire connections aside from the reference wire connection on the basis of an arrival direction of a wireless signal received by one of the antenna elements in the combination of two antenna elements and a re-radiation direction of a wireless signal transmitted as a re-radiated wave by another of the antenna elements corresponding to the one of the antenna elements, taking into account a phase difference between a signal transmitted by the wire connections connected to the one of the antenna elements and a signal transmitted by the reference wire connection; and a phase adjustment step of, for each of the wire connections aside from the reference wire connection, applying phase rotation to the signal transmitted by the wire connection in accordance with the phase adjustment amount calculated in the phase adjustment amount calculation step.

One aspect of the present invention is the above-described relay method, wherein the wireless signal contains a plurality of frames that are time-divided; the phase adjustment amount calculation step calculates, for each of the wire connections aside from the reference wire connection, the phase adjustment amount for each of the frames contained in the wireless signal received by the one of the antenna elements, on the basis of an arrival direction of the wireless signal containing the frame and a re-radiation direction of the wireless signal containing the frame, taking into account the phase difference between the signal transmitted by the wire connections connected to the one of the antenna elements and the signal transmitted by the reference wire connection; and the phase adjustment step detects the frame from the signal transmitted by the wire connection, and applies phase rotation to the phase of the detected frame in accordance with the phase adjustment amount corresponding to the detected frame.

One aspect of the present invention is the above-described relay method, wherein the wireless signal is transmitted at a plurality of wavelengths; the phase adjustment amount calculation step calculates, for each of the wire connections aside from the reference wire connection, the phase adjustment amount for each of different wavelengths received by the one of the antenna elements on the basis of an arrival direction of the wireless signal of the wavelength and a re-radiation direction of a wireless signal of the wavelength transmitted as a re-radiated wave by the other of the antenna elements, taking into account a phase difference between signals of the wavelength transmitted by the wire connections connected to the one of the antenna elements and a signal of the wavelength transmitted by the reference wire connection; and the phase adjustment step separates the signals transmitted by the wire connections into each of the wavelengths, and applies phase rotation to the phase of the signal of each of the wavelength obtained by the separating, in accordance with the phase adjustment amount corresponding to each of the wavelengths.

Effects of the Invention

According to the present invention, it is possible to radiate wireless signal radio waves arriving from any arrival direction to any re-radiation direction using an array antenna.

DESCRIPTION OF EMBODIMENTS

First Embodiment

Figure 1:
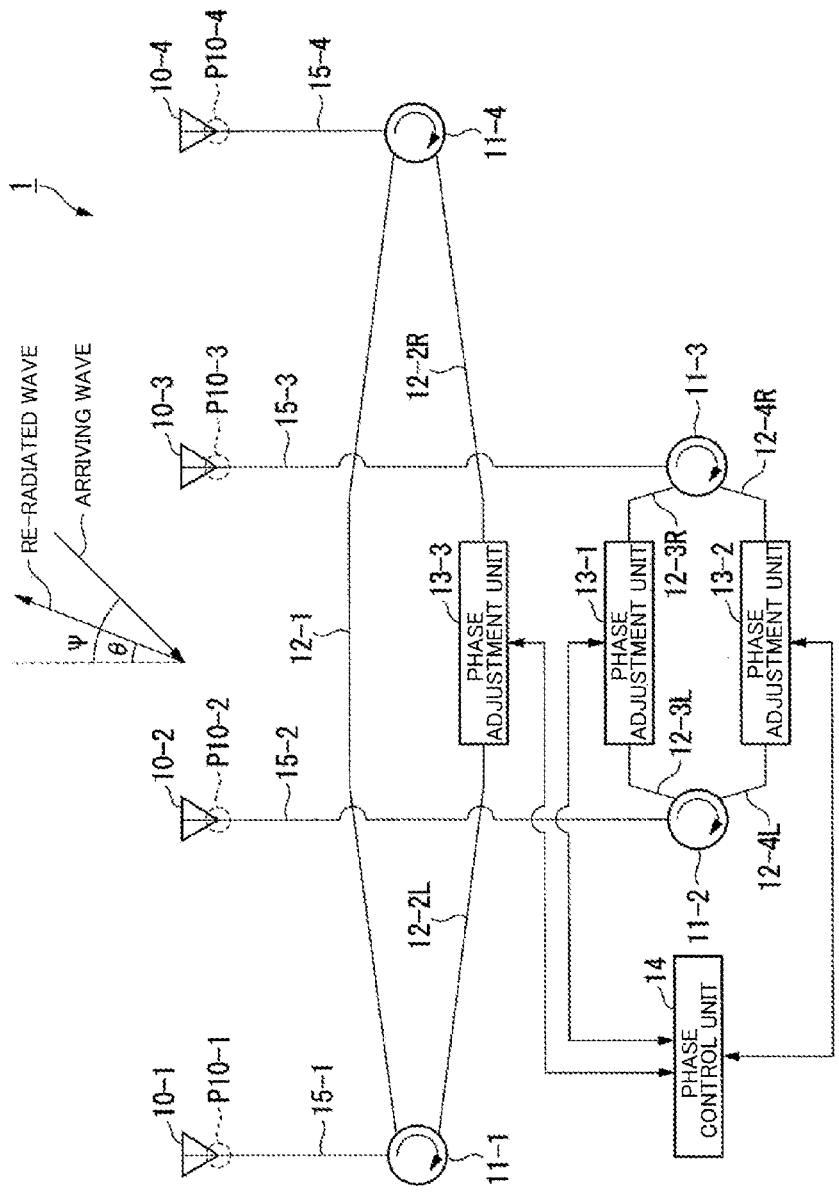
FIG. 1 is a block diagram illustrating the configuration of a relay device according to a first embodiment.

Hereinafter, an embodiment of the present invention will be described with reference to the drawings. FIG. 1 is a block diagram illustrating the configuration of a relay device 1 according to a first embodiment. The relay device 1 includes a plurality of antenna elements 10 (10-1, 10-2, 10-3, and 10-4), a plurality of circulators 11 (11-1, 11-2, 11-3, and 11-4), a plurality of phase adjustment units 13 (13-1, 13-2, and 13-3), and a phase control unit 14. All wireless signal radio waves arriving at the relay device 1 and all wireless signal radio waves re-radiated by the relay device 1 have the same wavelength $\lambda$.

The antenna elements 10 receive wireless signal radio waves. Each antenna element 10 converts the received wireless signal into an electrical signal, and outputs the electrical signal to a wire connection connected thereto. The antenna element 10-1 outputs the electrical signal to a wire connection 15-1 connected to the antenna element 10-1. The antenna element 10-2 outputs the electrical signal to a wire connection 15-2 connected to the antenna element 10-2. The antenna element 10-3 outputs the electrical signal to a wire connection 15-3 connected to the antenna element 10-3. The antenna element 10-4 outputs the electrical signal to a wire connection 15-4 connected to the antenna element 10-4. The antenna elements 10-1, 10-2, 10-3, and 10-4 are arranged at equal spacing d. In other words, the antenna elements are arranged so that a length between the antenna elements 10-1 and 10-2, a length between the antenna elements 10-2 and 10-3, and a length between the antenna elements 10-3 and 101-4 are the same length d.

In the antenna elements 10-1, 10-2, 10-3, and 10-4, antenna elements located symmetrically with respect to the center of the array are connected to each other such that path lengths are the same path length L. In other words, the antenna elements are connected such that the length of a path between the antenna elements 10-1 and 10-4, and the length of a path between the antenna elements 10-2 and 10-3, are the same path length L.

The circulators 11 include three connection terminals, and are connected to the antenna elements 10 by wire connections. The circulator 11-1 is connected to the antenna element 10-1 by the wire connection 15-1. The circulator 11-2 is connected to the antenna element 10-2 by the wire connection 15-2. The circulator 11-3 is connected to the antenna element 10-3 by the wire connection 15-3. The circulator 11-4 is connected to the antenna element 10-4 by the wire connection 15-4. Each of the circulators 11-1 to 11-4 outputs a signal taken in at one of the connection terminals to the connection terminal located next in the clockwise direction. Each of the combination of the circulators 11-1 and 11-4 and the combination of the circulators 11-2 and 11-3 are connected by two paths having directionality.

The circulator 11-1 is connected to two paths, namely wire connections 12-1 and 12-2L. The circulator 11-4 is connected to two paths, namely wire connections 12-1 and 12-2R. The wire connection 12-1 is set in advance as a wire connection, serving as a reference, which does not apply phase rotation (called a "reference wire connection" hereinafter).

The phase adjustment unit 13-3 is provided between the wire connection 12-2L and the wire connection 12-2R. The phase adjustment unit 13-3 applies phase rotation to the signal. In the following, the wire connections 12-2L and 12-2R will be referred to as a wire connection 12-2 when indicated together.

The circulator 11-2 is connected to two paths, namely a wire connection 12-3L and a wire connection 12-4L. The circulator 11-3 is connected to two paths, namely a wire connection 12-3R and a wire connection 12-4R. The phase adjustment unit 13-1 is provided between the wire connection 12-3L and the wire connection 12-3R, and the phase adjustment unit 13-2 is provided between the wire connection 12-4L and the wire connection 12-4R. In the following, the wire connections 12-3L and 12-3R will be referred to as a wire connection 12-3 when indicated together, and the wire connections 12-4L and 12-4R will be referred to as a wire connection 12-4 when indicated together.

In the following descriptions, a connection point between the antenna element 10-1 and the wire connection 15-1 is indicated by P10-1, a connection point between the antenna element 10-2 and the wire connection 15-2 is indicated by P10-2, a connection point between the antenna element 10-3 and the wire connection 15-3 is indicated by P10-3, and a connection point between the antenna element 10-4 and the wire connection 15-4 is indicated by P10-4. It is assumed that a distance of a path from the connection point P10-1 to the connection point P10-4 via the wire connection 15-1, the circulator 11-1, the wire connection 12-1, the circulator 11-4, and the wire connection 15-4 is L. At this time, a distance of a path in the reverse direction, from the connection point P10-4 to the connection point P10-1 via the wire connection 15-4, the circulator 11-4, the wire connection 12-2R, the phase adjustment unit 13-3, the wire connection 12-2L, the circulator 11-1, and the wire connection 15-1, is also L.

A distance of a path from the connection point P10-2 to the connection point P10-3 via the wire connection 15-2, the circulator 11-2, the wire connection 12-3L, the phase adjustment unit 13-1, the wire connection 12-3R, the circulator 11-3, and the wire connection 15-3 is also L. A distance of a path in the reverse direction, from the connection point P10-3 to the connection point P10-2 via the wire connection 15-3, the circulator 11-3, the wire connection 12-4R, the phase adjustment unit 13-2, the wire connection 12-4L, the circulator 11-2, and the wire connection 15-2, is also L.

Figure 2:
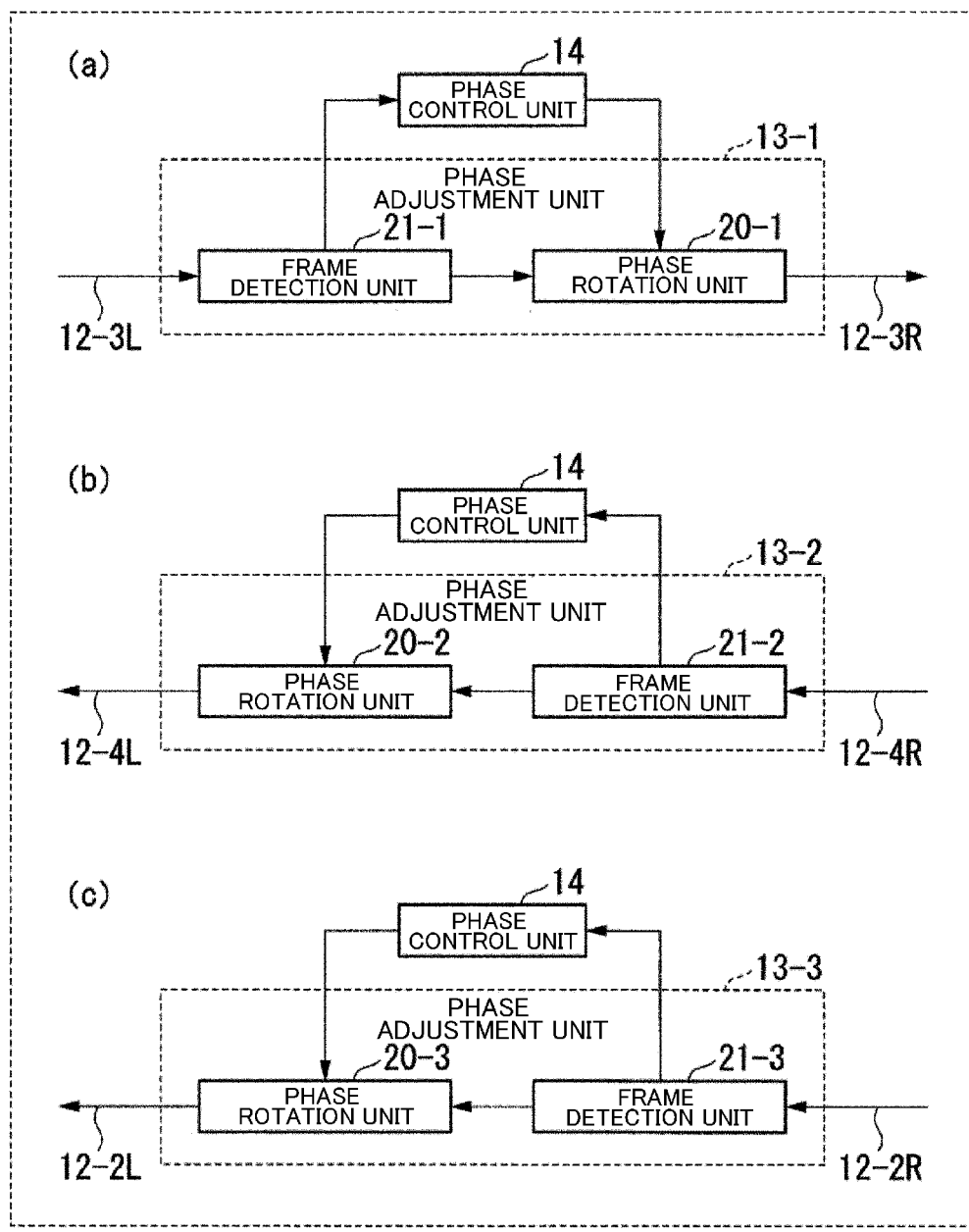
FIG. 2 is a block diagram illustrating a connection relationship between the internal configuration of a phase adjustment unit and a phase control unit according to the first embodiment.

The phase adjustment units 13-1, 13-2, and 13-3 have the internal configurations illustrated in FIGS. 2($a$), ($b$), and ($c$), respectively. The phase adjustment unit 13-1 includes a frame detection unit 21-1 and a phase rotation unit 20-1. The phase adjustment units 13-2 and 13-3 include the same functional units as the phase adjustment unit 13-1, with only the branch numbers of the functional units being different.

The wireless signals received by the antenna elements 10-1 to 10-4 contain a plurality of frames time-divided for each signal from each source to each destination. For example, a given frame is a frame from a source A to a destination B, and the next frame is a frame from a source C to a source D.

As such, a re-radiation direction of each frame will differ depending on the destination. To find the re-radiation direction of each frame, each frame includes data indicating the source (called "source data" hereinafter) and data indicating the destination (called "destination data" hereinafter) of that frame.

The frame detection units 21 detect frames included in the signals output by the antenna elements 10. The frame detection unit 21-1 detects a frame included in the signal that is output by the antenna element 10-2 and that is transmitted by the wire connection 12-3L. The frame detection unit 21-2 detects a frame included in the signal that is output by the antenna element 10-3 and that is transmitted by the wire connection 12-4R. The frame detection unit 21-3 detects a frame included in the signal that is output by the antenna element 10-4 and that is transmitted by the wire connection 12-2R.

The frame detection units 21-1 to 21-3 read out the source data and the destination data included in the detected frames. The frame detection units 21-1 to 21-3 associate the read-out source data and destination data with the detected frames. The frame detection units 21-1 to 21-3 output the detected frames, the source data, and the destination data to the phase control unit 14. The frame detection units 21-1, 21-2, and 21-3 also output the detected frames to the phase rotation units 20-1, 20-2, and 20-3 respectively connected thereto.

The phase rotation units 20-1, 20-2, and 20-3 apply phase rotation to the frames and in accordance with a phase adjustment amount calculated for each frame by the phase control unit 14, and output the frames.

The phase control unit 14 takes in the frames, the source data, and the destination data output by the frame detection units 21-1, 21-2, and 21-3. The antenna elements 10-2, 10-3, and 10-4 receive the same wireless signal at different times. As such, the frame detection units 21-1, 21-2, and 21-3 detect the same frame, but at different detection times, and output the frame to the phase control unit 14. On the basis of the three identical frames output by the frame detection units 21-1, 21-2, and 21-3 and positional relationships among the antenna elements 10-2, 10-3, and 10-4, the phase control unit 14 estimates an arrival direction of the wireless signal including the frame. For example, the phase control unit 14 uses a typical radio wave arrival direction estimation algorithm or the like to estimate the arrival direction of the wireless signal. For example, the beamformer method and the MUSIC method can be given as examples of the radio wave arrival direction estimation algorithm.

The phase control unit 14 calculates a re-radiation direction for a wireless signal including the frame on the basis of one of the estimated arrival direction, the source data, and the destination data.

The phase control unit 14 calculates the phase adjustment amount for each frame on the basis of the arrival direction of the wireless signal including the frame and the re-radiation direction of the wireless signal including that frame. At this time, the phase control unit 14 calculates the phase adjustment amount for each frame taking into account a phase difference between a signal transmitted by the wire connection 12-1, which is the reference wire connection, and the signals including the frames output by the frame detection units 21-1, 21-2, and 21-3. The phase control unit 14 outputs the phase adjustment amount calculated for each frame to the phase rotation units 20-1, 20-2, and 20-3 corresponding to each frame.

Processing by Relay Device of First Embodiment

Figure 3:
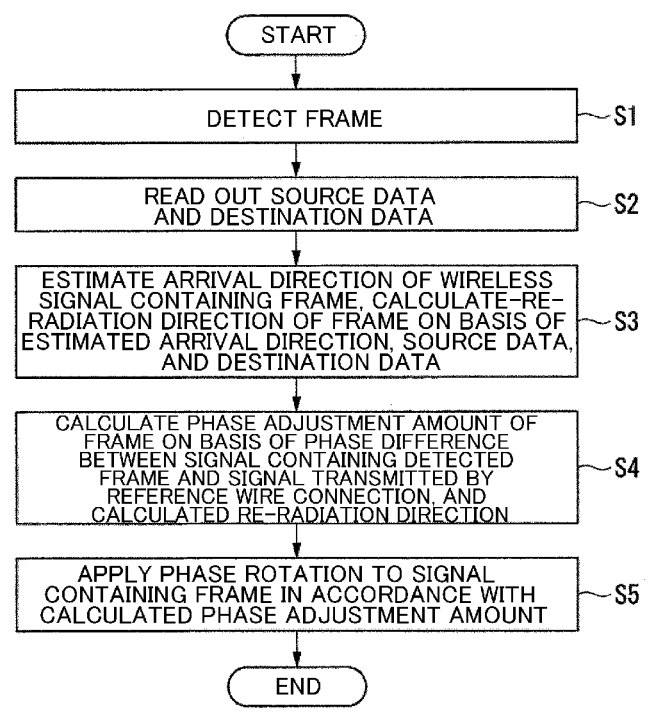
FIG. 3 is a flowchart illustrating the flow of processing by the relay device according to the first embodiment.

FIG. 3 is a flowchart illustrating the flow of processing by the relay device 1 according to the first embodiment. Processing performed when the antenna element 10-4 receives a wireless signal radio wave and the antenna element 10-1 re-radiates the wave will be described as an example.

Assume that the antenna element 10-4 has received a wireless signal radio wave arriving in an arrival direction $\psi$. The antenna element 10-4 converts the received wireless signal into an electrical and outputs the converted signal to the wire connection 15-4. The wire connection 15-4 transmits the signal as far as the circulator 11-4. The circulator 11-4 outputs the signal taken in from the wire connection 15-4 to the wire connection 12-2R connected to the next connection terminal.

The frame detection unit 21-3 of the phase adjustment unit 13-3 takes into the signal transmitted by the wire connection 12-2R and detects a frame from the signal taken in (step S1). The frame detection unit 21-3 outputs the detected frame to the phase rotation unit 20-3.

The frame detection unit 21-3 reads out the source data and the destination data included in the detected frame. The frame detection unit 21-3 associates the read-out source data and destination data with the detected frame. The frame detection unit 21-3 outputs the detected frames, the source data, and the destination data associated with each other to the phase control unit 14 (step S2). The phase control unit 14 takes in the frame, the source data, and the destination data output by the frame detection unit 21-3.

The frame detection unit 21-1 of the phase adjustment unit 13-1 and the frame detection unit 21-2 of the phase adjustment unit 13-2 also detect, and output to the phase control unit 14, the same frame as the frame detected by the frame detection unit 21-3, in the above-described manner.

Using the three identical frames output by the frame detection units 21-1, 21-2, and 21-3, the phase control unit 14 estimates the arrival direction $\psi$ of the wireless signal including the frame.

The phase control unit 14 calculates the re-radiation direction for the wireless signal including the frame on the basis of one of the estimated arrival direction $\psi$, the source data taken in from the frame detection unit 21-3, and the destination data taken in from the frame detection unit 21-3 (step S3). Here, the source data and the destination data are assumed to be, for example, coordinate information indicating positions of the source and the destination. If coordinate information indicating the position of the relay device 1 is already known, the phase control unit 14 can calculate the re-radiation direction on the basis of the coordinate information indicating the position of the destination and the coordinate information indicating the position of the relay device 1.

On the basis of the estimated arrival direction $\psi$ and the calculated re-radiation direction, the phase control unit 14 calculates a phase adjustment amount for the frame taken in from the frame detection unit 21-3, taking into account the phase difference between the signal transmitted by the wire connection 12-2R and the signal transmitted by the wire connection 12-1, which is the reference wire connection (step S4). For example, when a radio wave arrives in the arrival direction $\psi$ from the upper-right diagonal as illustrated in FIG. 1, the signal transmitted by the wire connection 12-2R is a signal received at a time earlier than the signal transmitted by the wire connection 12-1 serving as the reference wire connection. As such, the phase control unit 14 calculates the phase adjustment amount taking into account a phase difference corresponding to that time difference.

The phase control unit 14 outputs the calculated phase adjustment amount to the phase rotation unit 20-3. On the basis of the phase adjustment amount output by the phase control unit 14, the phase rotation unit 20-3 applies phase rotation to the frame corresponding to that phase adjustment amount (step S5). The phase rotation unit 20-3 outputs the frame to which the phase rotation has been applied to the wire connection 12-2L. The frame output by the phase rotation unit 20-3 is transmitted by the wire connection 12-2L, passes through the circulator 11-1, and is re-radiated from the antenna element 10-1 in the calculated re-radiation direction as a wireless signal.

In the above-described step S5, it is necessary for the phase rotation unit 20-3 to be capable of detecting a frame corresponding to the phase adjustment amount from among the frames taken in from the frame detection unit 21-3. For example, the phase control unit 14 associates the corresponding source data and destination data with the phase adjustment amount and outputs the associated phase adjustment amount to the phase rotation unit 20-3. This makes it possible for the phase rotation unit 20-3 to detect the frame corresponding to the source data and destination data associated with the phase adjustment amount, and apply, to the detected frame, phase rotation according to the phase adjustment amount.

Additionally, when each of the frames includes identification information enabling the frame to be uniquely identified, the phase control unit 14 may read out the corresponding identification information from the frame output by the frame detection unit 21-3, associate the read-out identification information with the phase adjustment amount, and output the associated phase adjustment amount to the phase rotation unit 20-3. In this case, the phase rotation unit 20-3 can detect a frame corresponding to the identification information associated with the phase adjustment amount and apply phase rotation according to the phase adjustment amount to the detected frame.

The above-described processes of steps S1 to S5 are performed in the same manner for the other phase adjustment units 13-1 and 13-2.

Figure 15:
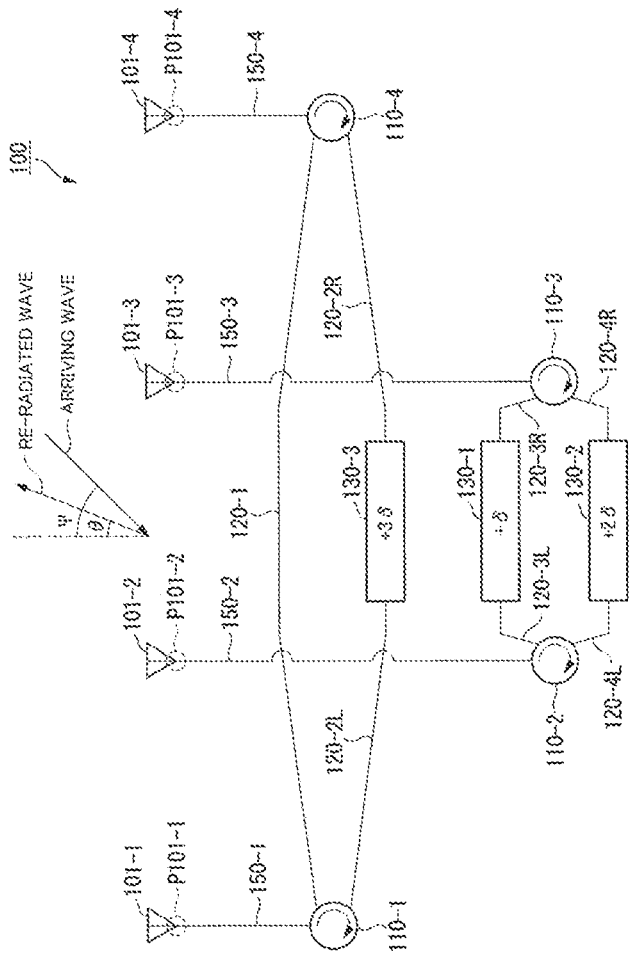
FIG. 15 is a block diagram illustrating the configuration of a relay device for a four-element Van Atta array based on the principles disclosed in NPL 1.
Figure 16:
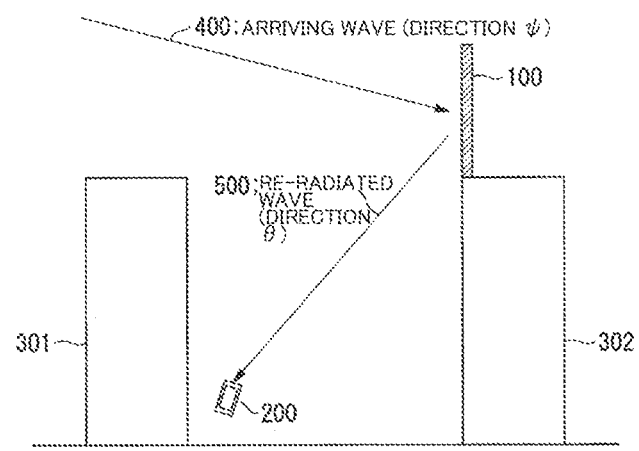
FIG. 16 is a diagram illustrating an example of applying the relay device illustrated in FIG. 15 to wireless relay to a hidden area.

As described above, the wireless signal radio wave arrives at the relay device 1 in the arrival direction $\psi$. At this time, the phases of the arriving waves at the antenna elements 10-1 to 10-4 can be expressed as 0, $\tau$, $2\tau$, and $3\tau$, respectively, using the arrival direction $\psi$, the spacing d between the antenna elements 10-1 to 10-4, and the wavelength $\lambda$ of the arriving wave, as described with reference to FIG. 15.

Here, $\tau$ is expressed by Equation (1). In other words, the phase difference between the signal transmitted by the wire connection 12-1, i.e., the reference wire connection, and the signal transmitted by the wire connection 12-3L, is $\tau$. The phase difference between the signal transmitted by the reference wire connection and the signal transmitted by the wire connection 12-4R is $2\tau$. The phase difference between the signal transmitted by the reference wire connection and the signal transmitted by the wire connection 12-2R is $3\tau$.

When the calculated re-radiation direction is $\theta$, the phase control unit 14 calculates phase adjustment amounts $\delta$, $2\delta$, and $3\delta$ on the basis of the estimated arrival direction $\psi$ and the calculated re-radiation direction $\theta$, taking into account the phase differences $\tau$, $2\tau$, and $3\tau$ between the respective signals to which the phase rotation units 20-1, 20-2, and 20-3 apply the phase rotation and the signal transmitted by the wire connection 12-1, which is the reference wire connection.

Each of the phase rotation units 20-1, 20-2, and 20-3 applies phase rotation to the frame on the basis of the phase adjustment amounts $\delta$, $2\delta$, and $3\delta$ calculated by the phase control unit 14. Through this, wireless signals to which phase rotation is applied are re-radiated from the antenna elements 10-3, 10-2, and 10-1. The wireless signals re-radiated from the antenna elements 10-1 to 10-4 strengthen each other in-phase in the re-radiation direction $\theta$, and thus a strong radio wave is radiated in the re-radiation direction $\theta$.

(Wireless Relay from Single Arrival Direction to Plurality of Re-Radiation Directions)

Figure 4:
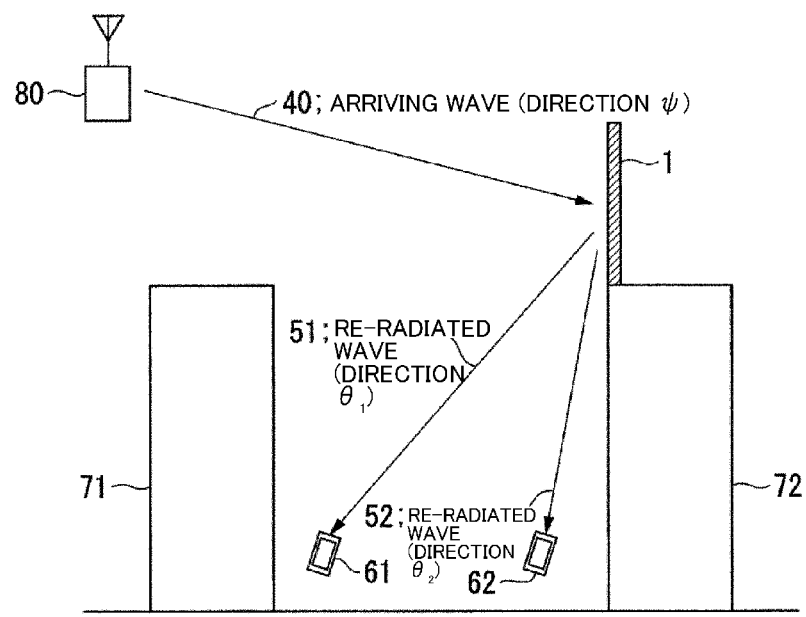
FIG. 4 is a diagram illustrating wireless relay from a single arrival direction to a plurality of re-radiation directions according to the first embodiment.

Assume, for example, that the relay device 1 of the first embodiment is applied to a hidden environment such as that illustrated in FIG. 4. In FIG. 4, two terminal devices 61 and 62 are surrounded by two structures 71 and 72, and are therefore located in a place where it is difficult for radio waves from a base station device 80 to reach. The relay device 1 is installed on the structure 72.

For example, an arriving wave 40 radiated by the base station device 80 arrives at the relay device 1 in the arrival direction $\psi$. The source data included in the frame of the wireless signal of the arriving wave 40 is data indicating the position of the base station device 80, and the destination data is data indicating the position of the terminal device 61 or data indicating the position of the terminal device 62.

If, in step S3, the destination data is data indicating the position of the terminal device 61, the phase control unit 14 calculates $\theta_1$ as the re-radiation direction to the terminal device 61, on the basis of the destination data included in the frame and the data indicating the position of the relay device 1. If the destination data is data indicating the position of the terminal device 62, the phase control unit 14 calculates $\theta_2$ as the re-radiation direction to the terminal device 62, on the basis of the destination data included in the frame and the data indicating the position of the relay device 1.

In step S4, using the following Equation (12), the phase control unit 14 calculates the phase adjustment amount $\delta$ for the phase rotation unit 20-1 on the basis of the calculated re-radiation direction $\theta_1$ to the terminal device 61 and the arrival direction $\psi$.

[Math. 12]

$$\delta = \frac{2\pi d}{\lambda}(\sin\theta_1 - \sin\psi) \quad (12)$$

The phase control unit 14 calculates the phase adjustment amounts $2\delta$ and $3\delta$ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts $\delta$, $2\delta$, and $3\delta$ calculated by the phase control unit 14. Through this, for a wireless signal of the frame including data indicating the position of the terminal device 61, which serves as the destination data, a re-radiated wave 51 is radiated in the direction of the re-radiation direction $\theta_1$, and the terminal device 61 can receive the re-radiated wave 51.

Likewise, in step S4, using the following Equation (13), the phase control unit 14 calculates the phase adjustment amount $\delta$ for the phase rotation unit 20-1 on the basis of the calculated re-radiation direction $\theta_2$ to the terminal device 62 and the arrival direction $\psi$.

[Math. 13]

$$\delta = \frac{2\pi d}{\lambda}(\sin\theta_2 - \sin\psi) \quad (13)$$

The phase control unit 14 calculates the phase adjustment amounts $2\delta$ and $3\delta$ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts $\delta$, $2\delta$, and $3\delta$ calculated by the phase control unit 14. Through this, for a wireless signal of the frame including data indicating the position of the terminal device 62, which serves as the destination data, a re-radiated wave 52 is radiated in the direction of the re-radiation direction $\theta_2$, and the terminal device 62 can receive the re-radiated wave 52.

In this manner, the base station device 80 can transmit wireless signals to the two terminal devices 61 and 62 at different positions. If only the terminal device 61 is present, the base station device 80 can continue to transmit the wireless signal to the terminal device 61 even in a case such as where the terminal device 61 moves to the position of the terminal device 62.

(Wireless Relay that Reverses Arrival Direction and Re-Radiation Direction)

Figure 5:
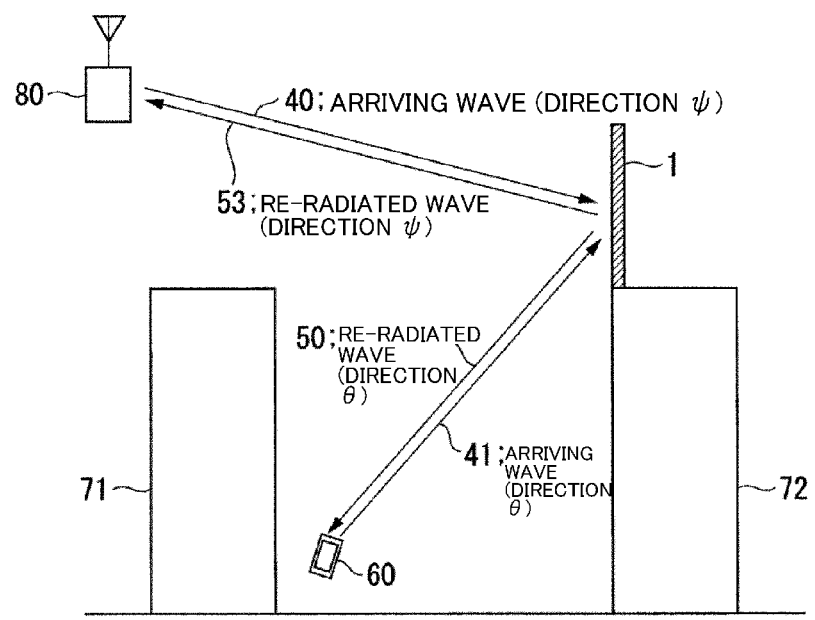
FIG. 5 is a diagram illustrating wireless relay in which the arrival direction and the re-radiation direction can be reversed, according to the first embodiment.

Assume, for example, that the relay device 1 of the first embodiment is applied to a hidden environment such as that illustrated in FIG. 5. In FIG. 5, a terminal device 60 is surrounded by the two structures 71 and 72, and is therefore located in a place where it is difficult for radio waves from the base station device 80 to reach. The relay device 1 is installed on the structure 72. Assume that the relay device 1 transmits and receives wireless signals between the base station device 80 and the terminal device 60 through Time Division Duplex (TDD).

For example, an arriving wave 40 radiated by the base station device 80 arrives at the relay device 1 in the arrival direction ψ. The source data included in the frame of the wireless signal of the arriving wave 40 is data indicating the position of the base station device 80, and the destination data is data indicating the position of the terminal device 60. In step S3, the phase control unit 14 calculates θ as the re-radiation direction to the terminal device 60, on the basis of the destination data included in the frame and the data indicating the position of the relay device 1.

On the other hand, an arriving wave 41 radiated by the terminal device 60 reaches the relay device 1 at an arrival direction θ. The source data included in the frame of the wireless signal of the arriving wave 41 is data indicating the position of the terminal device 60, and the destination data is data indicating the position of the base station device 80. In step S3, the phase control unit 14 calculates ψ as the re-radiation direction to the base station device 80, on the basis of the destination data included in the frame and the data indicating the position of the relay device 1.

Using Equation (7), the phase control unit 14 calculates the phase adjustment amount δ for the phase rotation unit 20-1 on the basis of the calculated re-radiation direction θ to the terminal device 60 and the arrival direction ψ. The phase control unit 14 calculates the phase adjustment amounts 2δ and 3δ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts δ, 2δ, and 3δ calculated by the phase control unit 14. Through this, for a wireless signal of the frame including data indicating the position of the terminal device 60, which serves as the destination data, a re-radiated wave 50 is radiated in the direction of the re-radiation direction $\theta_2$, and the terminal device 60 can receive the re-radiated wave 50.

Likewise, in step S4, using the following Equation (14), the phase control unit 14 calculates the phase adjustment amount δ for the phase rotation unit 20-1 on the basis of the calculated re-radiation direction ψ to the base station device 80 and the arrival direction θ.

[Math. 14]

$$\delta = \frac{2\pi d}{\lambda}(\sin\psi - \sin\theta) \tag{14}$$

The phase control unit 14 calculates the phase adjustment amounts 2δ and 3δ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts δ, 2δ, and 3δ calculated by the phase control unit 14. Through this, for a wireless signal of the frame including data indicating the position of the base station device 80, which serves as the destination data, a re-radiated wave 53 is radiated in the direction of the re-radiation direction ψ, and the base station device 80 can receive the re-radiated wave 53.

In this manner, the direction of radio waves radiated by the base station device 80 and reaching the terminal device 60, and the direction of radio waves radiated by the terminal device 60 and reaching the base station device 80, can be made reversible, and wireless signals can therefore be transmitted and received between the base station device 80 and the terminal device 60.

(Wireless Relay from Plurality of Arrival Directions to Single Re-Radiation Direction)

Figure 6:
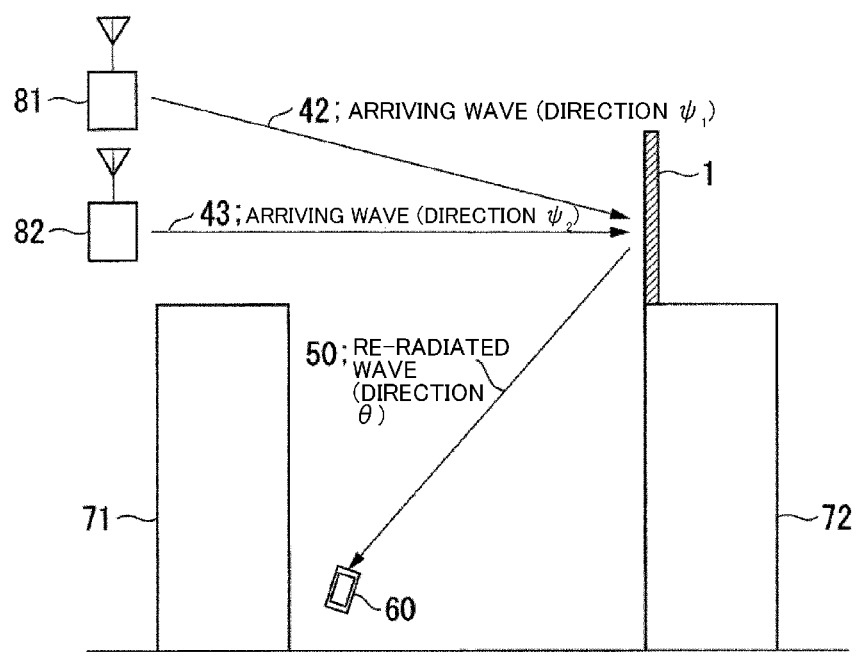
FIG. 6 is a diagram illustrating wireless relay from a plurality of arrival directions to a single re-radiation direction according to the first embodiment.

Assume, for example, that the relay device 1 of the first embodiment is applied to a hidden environment such as that illustrated in FIG. 6. In FIG. 6, the terminal device 60 is surrounded by the two structures 71 and 72, and is therefore located in a place where it is difficult for radio waves from two base station devices 81 and 82 to reach. The relay device 1 is installed on the structure 72.

For example, an arriving wave 42 radiated by the base station device 81 arrives at the relay device 1 in an arrival direction $\psi_i$. The source data included in the frame of the wireless signal of the arriving wave 42 is data indicating the position of the base station device 81, and the destination data is data indicating the position of the terminal device 60. In step S3, the phase control unit 14 calculates θ as the re-radiation direction to the terminal device 60, on the basis of the destination data included in the frame and the data indicating the position of the relay device 1.

On the other hand, an arriving wave 43 radiated by the base station device 82 arrives at the relay device 1 in an arrival direction $\psi_2$. The source data included in the frame of the wireless signal of the arriving wave 43 is data indicating the position of the base station device 82, and the destination data is data indicating the position of the terminal device 60. In step S3, the phase control unit 14 calculates θ as the re-radiation direction to the terminal device 60, on the basis of the destination data included in the frame and the data indicating the position of the relay device 1.

In step S4, using the following Equation (15), the phase control unit 14 calculates the phase adjustment amount δ for the phase rotation unit 20-1 on the basis of the calculated re-radiation direction θ to the terminal device 60 and the arrival direction $\psi_i$.

[Math. 15]

$$\delta = \frac{2\pi d}{\lambda}(\sin\theta - \sin\psi_1) \tag{15}$$

The phase control unit 14 calculates the phase adjustment amounts 2δ and 3δ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts δ, 2δ, and 3δ calculated by the phase control unit 14. Through this, for a wireless signal of the frame including data indicating the position of the base station device 81, which serves as the source data, and data indicating the position of the terminal device 60, which serves as the destination data, a re-radiated wave 50 is radiated in the direction of the re-radiation direction θ, and the terminal device 60 can receive the re-radiated wave 50.

Likewise, in step S4, using the following Equation (16), the phase control unit 14 calculates the phase adjustment amount δ for the phase rotation unit 20-1 on the basis of the calculated re-radiation direction θ to the terminal device 60 and the arrival direction $\psi_2$.

[Math. 16]

$$\delta = \frac{2\pi d}{\lambda}(\sin\theta - \sin\psi_2) \quad (16)$$

The phase control unit 14 calculates the phase adjustment amounts 2δ and 3δ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts δ, 2δ, and 3δ calculated by the phase control unit 14. Through this, for a wireless signal of the frame including data indicating the position of the base station device 82, which serves as the source data, and data indicating the position of the terminal device 60, which serves as the destination data, a re-radiated wave 50 is radiated in the direction of the re-radiation direction θ, and the terminal device 60 can receive the re-radiated wave 50.

In this manner, in a case such as where the arrival direction of the arriving wave changes from $\psi_1$ to $\psi_2$, e.g., when a wireless signal is being transmitted from the base station device 81 toward the terminal device 60, the terminal device 60 can continue to receive the wireless signal even if a malfunction has occurred in the base station device 81 and the terminal device 60 receives the wireless signal from the base station device 82, which serves as a backup.

(Wireless Relay from Plurality of Arrival Directions to Plurality of Re-Radiation Directions)

Figure 7:
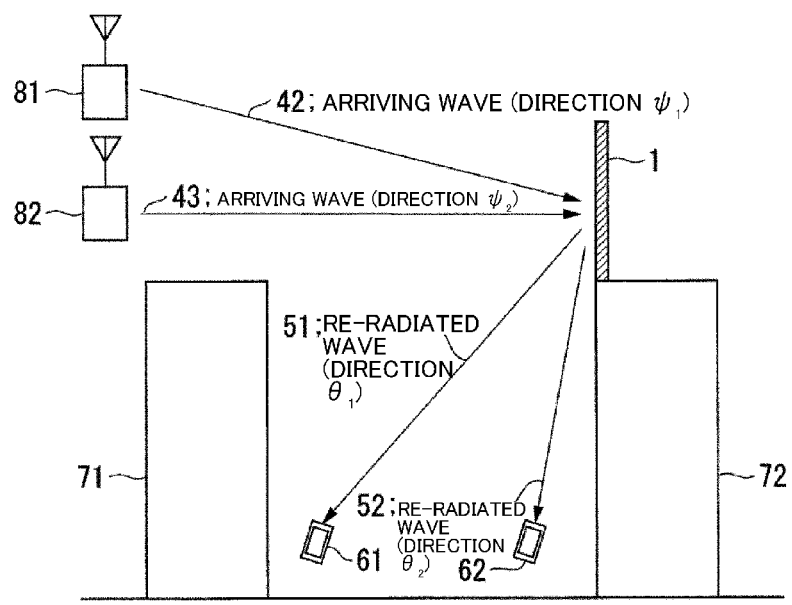
FIG. 7 is a diagram illustrating wireless relay from a plurality of arrival directions to a plurality of re-radiation directions according to the first embodiment.

Assume, for example, that the relay device 1 of the first embodiment is applied to a hidden environment such as that illustrated in FIG. 7. In FIG. 7, the two terminal devices 61 and 62 are surrounded by the two structures 71 and 72, and are therefore located in a place where it is difficult for radio waves from the two base station devices 81 and 82 to reach. The relay device 1 is installed on the structure 72. Assume here that the base station device 81 transmits the wireless signal toward the terminal device 61 and the base station device 82 transmits the wireless signal toward the terminal device 62.

For example, an arriving wave 42 radiated by the base station device 81 arrives at the relay device 1 in an arrival direction $\psi_1$. The source data included in the frame of the wireless signal of the arriving wave 42 is data indicating the position of the base station device 81, and the destination data is data indicating the position of the terminal device 61. In step S3, the phase control unit 14 calculates $\theta_1$ as the re-radiation direction to the terminal device 61, on the basis of the destination data included in the frame and the data indicating the position of the relay device 1.

On the other hand, an arriving wave 43 radiated by the base station device 82 arrives at the relay device 1 in an arrival direction $\psi_2$. The source data included in the frame of the wireless signal of the arriving wave 43 is data indicating the position of the base station device 82, and the destination data is data indicating the position of the terminal device 62. In step S3, the phase control unit 14 calculates $\theta_2$ as the re-radiation direction to the terminal device 62, on the basis of the destination data included in the frame and the data indicating the position of the relay device 1.

In step S4, using the following Equation (17), the phase control unit 14 calculates the phase adjustment amount δ for the phase rotation unit 20-1 on the basis of the calculated re-radiation direction $\theta_1$ to the terminal device 61 and the arrival direction $\psi_1$.

[Math. 17]

$$\delta = \frac{2\pi d}{\lambda}(\sin\theta_1 - \sin\psi_1) \quad (17)$$

The phase control unit 14 calculates the phase adjustment amounts 2δ and 3δ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts δ, 2δ, and 3δ calculated by the phase control unit 14. Through this, for a wireless signal of the frame including data indicating the position of the base station device 81, which serves as the source data, and data indicating the position of the terminal device 61, which serves as the destination data, a re-radiated wave 51 is radiated in the direction of the re-radiation direction $\theta_1$, and the terminal device 61 can receive the re-radiated wave 51.

Likewise, in step S4, using the following Equation (18), the phase control unit 14 calculates the phase adjustment amount δ for the phase rotation unit 20-1 on the basis of the calculated re-radiation direction $\theta_2$ to the terminal device 62 and the arrival direction $\psi_2$.

[Math. 18]

$$\delta = \frac{2\pi d}{\lambda}(\sin\theta_2 - \sin\psi_2) \quad (18)$$

The phase control unit 14 calculates the phase adjustment amounts 2δ and 3δ for each of the phase rotation units 20-2 and 20-3, taking into account the phase difference with the signal transmitted by the wire connection 12-1, which is the reference wire connection. Each of the phase rotation units 20-1, 20-2, and 20-3 applies phase rotation to the frame on the basis of the phase adjustment amounts δ, 2δ, and 3δ calculated by the phase control unit 14. Through this, for a wireless signal of the frame including data indicating the position of the base station device 82, which serves as the source data, and data indicating the position of the terminal device 62, which serves as the destination data, a re-radiated wave 52 is radiated in the direction of the re-radiation direction $\theta_2$, and the terminal device 62 can receive the re-radiated wave 52.

In the relay device 1 of the first embodiment described above, the array antenna has constant spacing between adjacent antenna elements, and each of the combinations of the two antenna elements 10-1 and 10-4, and the two antenna elements 10-2 and 10-3, which are positioned symmetrically with respect to the center of the array, are connected by wire connections in two paths. The lengths of the paths between the antenna elements in the two combinations of antenna elements are the same in all of the combinations. The wire connection 12-1 is set as a reference wire connection serving as a reference in advance, and the phase control unit 14 calculates a phase adjustment amount for each wire connection aside from the reference wire connection on the basis of the arrival direction of a wireless signal received by one antenna element in a combination of two antenna elements and the re-radiation direction of a wireless signal transmitted as a re-radiated wave by the other antenna element corresponding to the one antenna element, taking into account a phase difference between the signal transmitted by the wire connection connected to the one antenna element and the signal transmitted by the reference wire connection. The phase adjustment units 13-1, 13-2, and 13-3 are provided in the wire connections 12-3, 12-4, and 12-2 aside from the reference wire connection, and apply phase rotation to the signals transmitted by the wire connections 12-3R, 12-4L, and 12-2L in accordance with the phase adjustment amount calculated by the phase control unit 14.

To be more specific, in the first embodiment, the wireless signal includes a plurality of frames obtained through time division. Accordingly, for each wire connection aside from the reference wire connection, the phase control unit 14 calculates the phase adjustment amount for each of the frames included in the wireless signal received by the one antenna element, on the basis of the arrival direction of the wireless signal including that frame and the re-radiation direction of the wireless signal including that frame, taking into account the phase difference between the signal transmitted by the wire connection connected to the one antenna element in the signal transmitted by the reference wire connection. The phase adjustment units 13-1, 13-2, and 13-3 detect frames from the signals transmitted by the wire connections, and apply phase rotation to the phases of the detected frames in accordance with the phase adjustment amounts corresponding to the detected frames.

Through this, the phase control unit 14 can dynamically change the phase adjustment amounts of the phase adjustment units 13-1, 13-2, and 13-3, and when wireless signal radio waves have the same wavelength, the relay device 1 can use the array antenna to radiate a wireless signal radio waves arriving from a desired arrival direction in a desired re-radiation direction.

In the above-described first embodiment, the source data and the destination data included in the frame are coordinate information, and the phase control unit 14 calculates the re-radiation direction on the basis of the coordinate information of the relay device 1 and the destination data; however, the source data and the destination data may be any information which enables the re-radiation direction to be calculated. For example, the information may be information indicating a relative positional relationship between the source and the destination. In the case of information indicating a relative positional relationship, the phase control unit 14 calculates the re-radiation direction on the basis of the information indicating the relative positional relationship, the coordinate information of the relay device 1, and the direction of the arriving wave.

Additionally, the source data and the destination data may be address information capable of identifying the source and destination devices. In this case, the phase control unit 14 sets a re-radiation direction for the source data or the destination data in advance, and stores the direction in an internal storage region, for example. In the process of step S3, rather than calculating the re-radiation direction, the phase control unit 14 reads out the re-radiation direction corresponding to the source data or the destination data from the internal storage region, and uses the read-out re-radiation direction.

Additionally, in the above-described first embodiment, the frame detection units 21-1, 21-2, and 21-3 read out the source data and the destination data from the detected frames, but the frame detection units 21-1, 21-2, and 21-3 may instead output the detected frames to the phase control unit 14, and the phase control unit 14 may then read out the source data and the destination data from the received frames.

Second Embodiment

Figure 8:
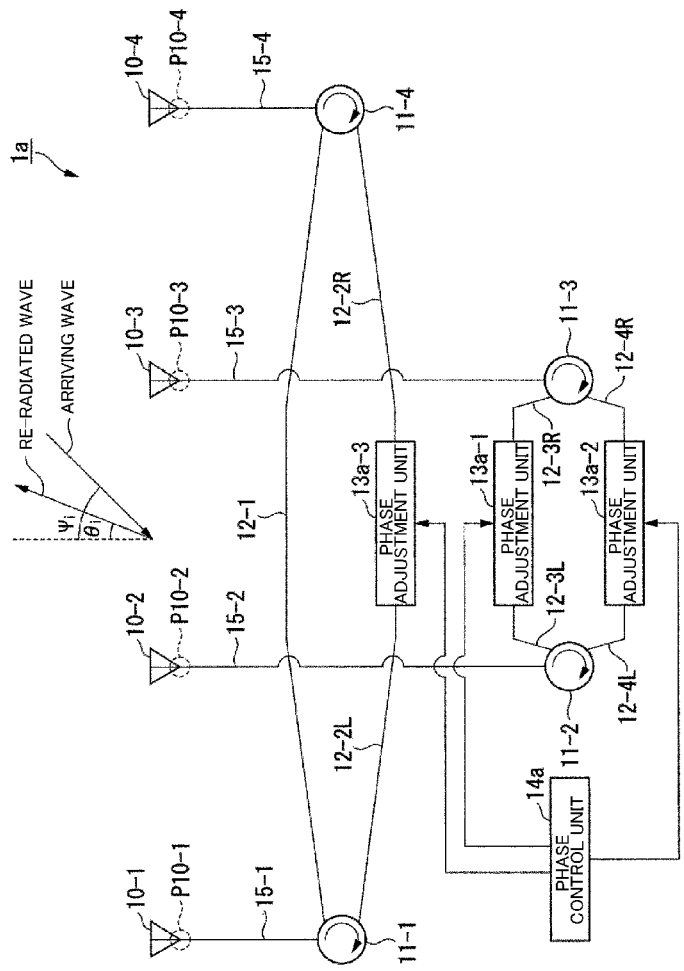
FIG. 8 is a block diagram illustrating the configuration of a relay device according to a second embodiment.

FIG. 8 is a block diagram illustrating the configuration of a relay device 1a according to a second embodiment. In FIG. 8, configurations that are the same as in the relay device 1 of the first embodiment are given the same reference signs, and the configurations which are different will be described hereinafter.

The relay device 1a includes the antenna elements 10-1, 10-2, 10-3, and 10-4, the circulators 11-1, 11-2, 11-3, and 11-4, phase adjustment units 13a-1, 13a-2 and 13a-3, and a phase control unit 14a. Unlike the first embodiment, in the second embodiment, wireless signal radio waves arriving at the relay device 1a and radio waves relayed and re-radiated by the relay device 1a are radio waves having a wavelength $\lambda_i$ of one of M different wavelengths $\lambda_1$ to $\lambda_M$. Here, i is an integer of 1 to M, and M is an integer of at least 2 or greater, and is assumed to be a fixed value.

Figure 9:
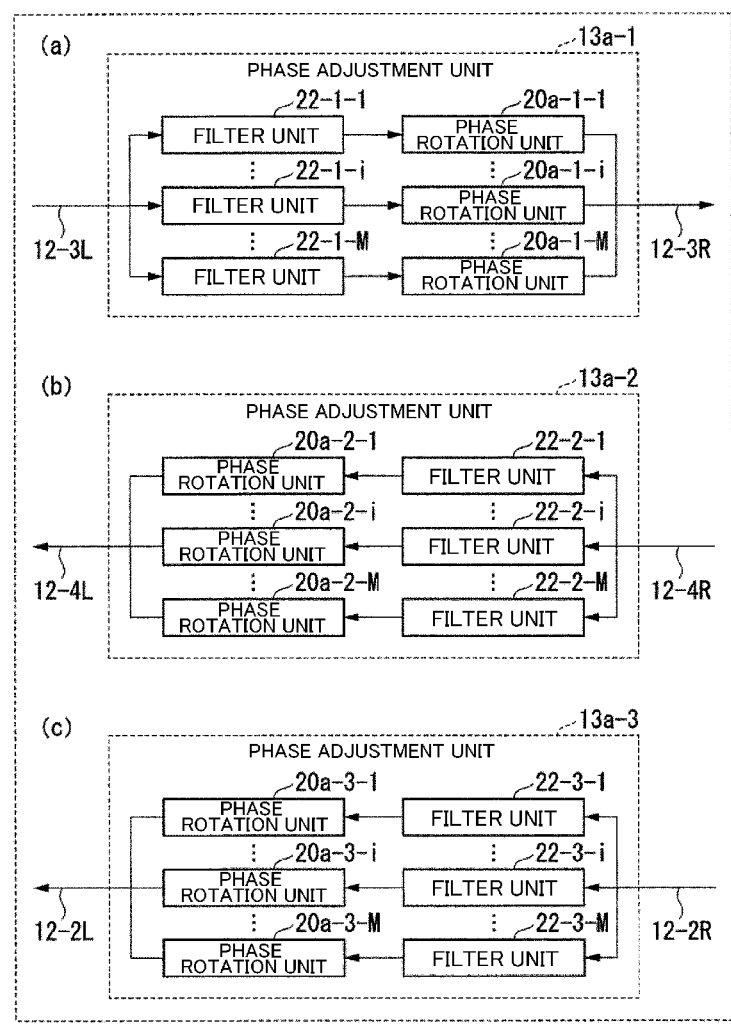
FIG. 9 is a block diagram illustrating the internal configuration of a phase adjustment unit according to the second embodiment.

The phase adjustment units 13a-3, 13a-1, and 13a-2 have the internal configurations illustrated in FIGS. 9(a), (b), and (c), respectively. The phase adjustment units 13a-3, 13a-1, and 13a-2 include M filter units 22-3-1 to 22-3-M, filter units 22-1-1 to 22-1-M, and filter units 22-2-1 to 22-2-M, respectively. The phase adjustment units 13a-3, 13a-1, and 13a-2 include M phase rotation units 20a-3-1 to 20a-3-M, phase rotation units 20a-1-1 to 20a-1-M, and phase rotation units 20a-2-1 to 20a-2-M, respectively.

The filter units 22-1-$i$, 22-2-$i$, and 22-3-$i$ are filters that filter signals of wavelengths aside from the wavelength $\lambda_i$ and allow only signals of the wavelength $\lambda_i$ to pass. It is assumed here that i can be an integer of 1 to M, as mentioned above.

The filter units 22-1-1 to 22-1-M, the filter units 22-2-1 to 22-2-M, and the filter units 22-3-1 to 22-3-M output the filtered signals to the phase rotation units 20a-1-1 to 20a-1-M, the phase rotation units 20a-2-1 to 20a-2-M, and the phase rotation units 20a-3-1 to 20a-3-M respectively connected thereto. The filter units 22-1-1 to 22-1-M, the filter units 22-2-1 to 22-2-M, and the filter units 22-3-1 to 22-3-M are each connected to the phase control unit 14a, and the filtered signals are output to the phase control unit 14a.

The phase rotation units 20a-1-1 to 20a-1-M, the phase rotation units 20a-2-1 to 20a-2-M, and the phase rotation units 20a-3-1 to 20a-3-M are each connected to the phase control unit 14a, and in accordance with phase adjustment amounts calculated by each, the phase control unit 14 applies phase rotation to the signals output by the filter units 22-1-1 to 22-1-M, the filter units 22-2-1 to 22-2-M, and the filter units 22-3-1 to 22-3-M connected to each, and outputs the signals.

The antenna elements 10-2, 10-3, and 10-4 receive wireless signals having the same wavelength $\lambda_i$ at different times. The filter units 22-1-$i$, 22-2-$i$, and 22-3-$i$ extract signals which have different detection times but the same wavelength $\lambda_i$ and output the signals to the phase control unit 14a. On the basis of the three signals having the same wavelength $\lambda_i$ and the positional relationships between the antenna elements 10-2, 10-3, and 10-4, the phase control unit 14a estimates an arrival direction of the wireless signal having the wavelength $\lambda_i$ using a typical radio wave arrival direction estimation algorithm.

In the second embodiment, for example, the re-radiation direction is set in advance for each wavelength $\lambda_i$, and the phase control unit 14a stores the M wavelengths $\lambda_1$ to $\lambda_M$ and the re-radiation directions corresponding to the wavelengths $\lambda_1$ to $\lambda_M$ in association with each other in an internal storage region in advance. The phase control unit 14a calculates the phase adjustment amount for each wavelength $\lambda_i$ on the basis of an arrival direction estimated for each wavelength $\lambda_i$ and the re-radiation direction corresponding to the wavelength $\lambda_i$, taking into account a phase difference between the signal of the wavelength $\lambda_i$ transmitted by the wire connection 12-1, which serves as the reference wire connection, and the signals of the wavelength $\lambda_i$ transmitted by the wire connections 12-3L, 12-4R, and 12-2R. The phase control unit 14a outputs the phase adjustment amount for each wavelength $\lambda_i$ to the corresponding ones of the phase rotation units 20a-1-i, 20a-2-i, and 20a-3-i.

For example, assume that the wireless signal radio wave of the wavelength $\lambda_i$ arrives at the arrival direction $\psi_i$ as illustrated in FIG. 8. In this case, the phases of the arriving waves at the antenna elements 10-1, 10-2, 10-3, and 10-4 are 0, $\tau_i$, $2\tau_i$, and $3\tau_i$, respectively. $\tau_i$ is expressed by the following Equation (19).

[Math. 19]

$$\tau_i = \frac{2\pi d}{\lambda_i} \sin \psi_i \tag{19}$$

Here, assume that the phase rotation unit 20a-1-i of the phase adjustment unit 13a-1 applies phase rotation at a phase adjustment amount $\delta_i$ to the signal of the wavelength $\lambda_i$ output by the filter unit 22-1-i. Assume also that the phase rotation unit 20a-2-i of the phase adjustment unit 13a-2 applies phase rotation at a phase adjustment amount $2\delta_i$ to the signal of the wavelength $\lambda_i$ output by the filter unit 22-2-i. Assume also that the phase rotation unit 20a-3-i of the phase adjustment unit 13a-3 applies phase rotation at a phase adjustment amount $3\delta_i$ to the signal of the wavelength $\lambda_i$ output by the filter unit 22-3-i.

In this case, the phases of the wireless signal radio waves of the wavelength $\lambda_i$ re-radiated from the antenna elements 10-1, 10-2, 10-3, and 10-4 are expressed by the following Equations (20) to (23).

[Math. 20]

$$3(\delta_i + \tau_i) + \frac{2\pi L}{\lambda_i} \tag{20}$$

[Math. 21]

$$2(\delta_i + \tau_i) + \frac{2\pi L}{\lambda_i} \tag{21}$$

[Math. 22]

$$\delta_i + \tau_i + \frac{2\pi L}{\lambda_i} \tag{22}$$

[Math. 23]

$$\frac{2\pi L}{\lambda_i} \tag{23}$$

As can be seen from Equation (20) to Equation (23), the phase difference between adjacent antenna elements is constant at $\delta_i + \tau_i$. In this case, the re-radiated wave is emitted in a direction $\theta_i$, which satisfies the following Equation (24).

[Math. 24]

$$\frac{2\pi d}{\lambda_i} \sin \theta_i = \delta_i + \tau_i \tag{24}$$

Accordingly, by calculating $\delta_i$ through the following Equation (25), the re-radiation direction of the wireless signal of the wavelength $\lambda_i$ becomes $\theta_i$, as indicated by the following Equation (26). Through this, the relay device 1a can re-radiate a wireless signal having a wavelength $\lambda_i$ from the arrival direction $\psi_i$ in the re-radiation direction $\theta_i$.

[Math. 25]

$$\delta_i = \frac{2\pi d}{\lambda_i} (\sin \theta_i - \sin \psi_i) \tag{25}$$

[Math. 26]

$$\arcsin(\sin \psi_i + \sin \theta_i - \sin \psi_i) = \theta_i \tag{26}$$

In other words, when the re-radiation direction with respect to the wavelength $\lambda_i$ is set in advance as $\theta_i$, the phase control unit 14a calculates the phase adjustment amount $\delta_i$ for the phase rotation unit 20a-1-i using Equation (25), on the basis of the estimated arrival direction $\psi_i$ of the wavelength $\lambda_i$ and the re-radiation direction $\theta_i$ set in advance with respect to the wavelength $\lambda_i$.

The phase control unit 14a calculates the phase adjustment amounts $2\delta_i$ and $3\delta_i$ for each of the phase rotation units 20a-2-i and 20a-3-i, taking into account the phase difference with the signal transmitted by the wire connection 12-1, which is the reference wire connection. The phase rotation units 20a-1-i, 20a-2-i, and 20a-3-i apply, to the signals output by the filter units 22-1-i, 22-2-i, and 22-3-i respectively connected thereto, phase rotation amounts according to the phase adjustment amounts $\delta_i$, $2\delta_i$, and $3\delta_i$ calculated by the phase control unit 14a. Through this, wireless signals to which phase rotation is applied are re-radiated from the antenna elements 10-3, 10-2, and 10-1. The wireless signals re-radiated from the antenna elements 10-1 to 10-4 strengthen each other in-phase in the re-radiation direction $\theta_i$, and thus a strong radio wave is radiated in the re-radiation direction $\theta_i$.

Processing by Relay Device of Second Embodiment

Figure 10:
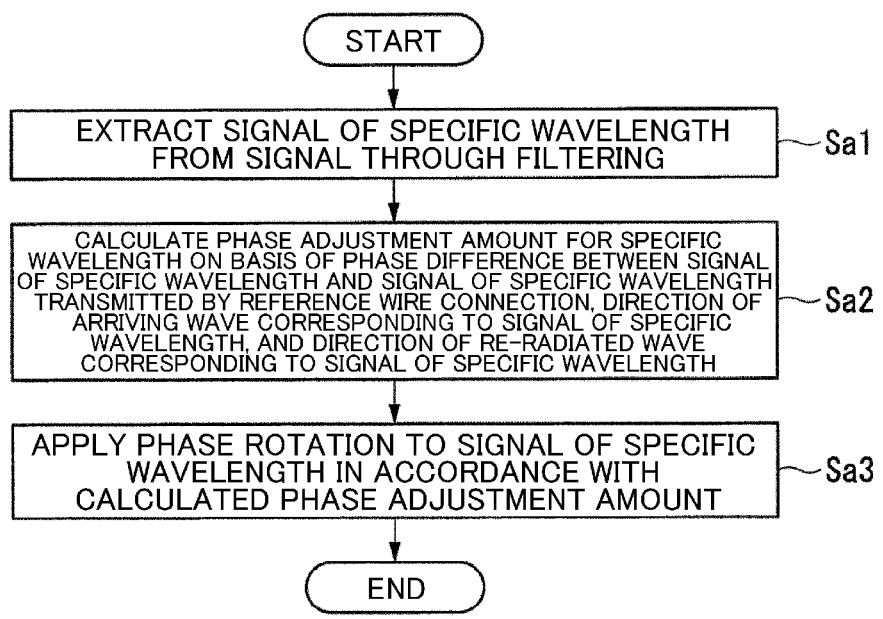
FIG. 10 is a flowchart illustrating the flow of processing by the relay device according to the second embodiment.

FIG. 10 is a flowchart illustrating the flow of processing by the relay device 1a according to the second embodiment. Processing performed when the antenna element 10-4 receives a wireless signal radio wave of a wavelength $\lambda_k$ and the antenna element 10-1 re-radiates the wave will be described as an example. Here, k is a value of any one of 1 to M. Note that $\theta_k$ is assumed to be set in advance as the re-radiation direction corresponding to the wavelength $\lambda_k$ and stored in advance in an internal storage region of the phase control unit 14a.

Assume that the antenna element 10-4 has received a wireless signal radio wave of the wavelength $\lambda_k$ arriving in an arrival direction $\psi_k$. The antenna element 10-4 converts the received wireless signal into an electrical and outputs the converted signal to the wire connection 15-4. The wire connection 15-4 transmits the signal as far as the circulator 11-4. The circulator 11-4 outputs the signal taken in from the wire connection 15-4 to the wire connection 12-2R connected to the next connection terminal.

The signal transmitted by the wire connection 12-2R is branched into M arts in the phase adjustment unit 13a-3. Each of the filter units 22-3-1 to 22-3-M takes in the branched signal. The signal taken in by each is a signal of the wavelength $\lambda_k$, and thus only the filter unit 22-3-k extracts the signal of the wavelength $\lambda_k$ (step Sa1). The filter unit 22-3-k outputs the extracted signal of the wavelength $\lambda_k$ to the phase control unit 14a and the phase rotation unit 20a-3-k.

The filter unit 22-1-k of the phase adjustment unit 13a-1 and the filter unit 22-2-k of the phase adjustment unit 13a-2 also extract signals of the same wavelength $\lambda_k$ as the wavelength $\lambda_k$ extracted by the filter unit 22-3-k, and output the signals to the phase control unit 14a. Using the three signals of the same wavelength $\lambda_k$, the phase control unit 14a estimates the arrival direction $\psi_k$ of the wireless signal of the wavelength $\lambda_k$. The phase control unit 14a reads out the re-radiation direction $\theta_k$ corresponding to the wavelength $\lambda_k$ from the internal storage region.

On the basis of the estimated arrival direction $\psi_k$ and the read-out re-radiation direction $\theta_k$, the phase control unit 14a calculates a phase adjustment amount for the signal of the wavelength $\lambda_k$, taking into account the phase difference between the signal transmitted by the wire connection 12-2R and the signal transmitted by the wire connection 12-1, which is the reference wire connection (step Sa2). For example, when a radio wave arrives in the arrival direction $\psi_k$ from the upper-right diagonal in FIG. 8, the signal transmitted by the wire connection 12-2R is a signal received at a time earlier than the signal transmitted by the wire connection 12-1 serving as the reference wire connection. As such, the phase control unit 14a calculates the phase adjustment amount taking into account a phase difference corresponding to that time difference.

The phase control unit 14a outputs the calculated phase adjustment amount to the phase rotation unit 20a-3-k. On the basis of the phase adjustment amount output by the phase control unit 14a, the phase rotation unit 20a-3-k applies phase rotation to the signal of the wavelength $\lambda_k$ output by the filter unit 22-3-k (step Sa3). The phase rotation unit 20a-3-k outputs the signal of the wavelength $\lambda_k$ to which the phase rotation has been applied to the wire connection 12-2L. The signal of the wavelength $\lambda_k$ output by the phase rotation unit 20a-3-k is transmitted by the wire connection 12-2L, passes through the circulator 11-1, and is re-radiated from the antenna element 10-1 in the re-radiation direction $\theta_k$ as a wireless signal.

The above-described processes of steps Sa1 to Sa3 are performed in the same manner for the other phase adjustment units 13a-1 and 13a-2.

(Wireless Relay from Single Arrival Direction to Single Re-Radiation Direction when Plurality of Wavelengths Present)

Figure 11:
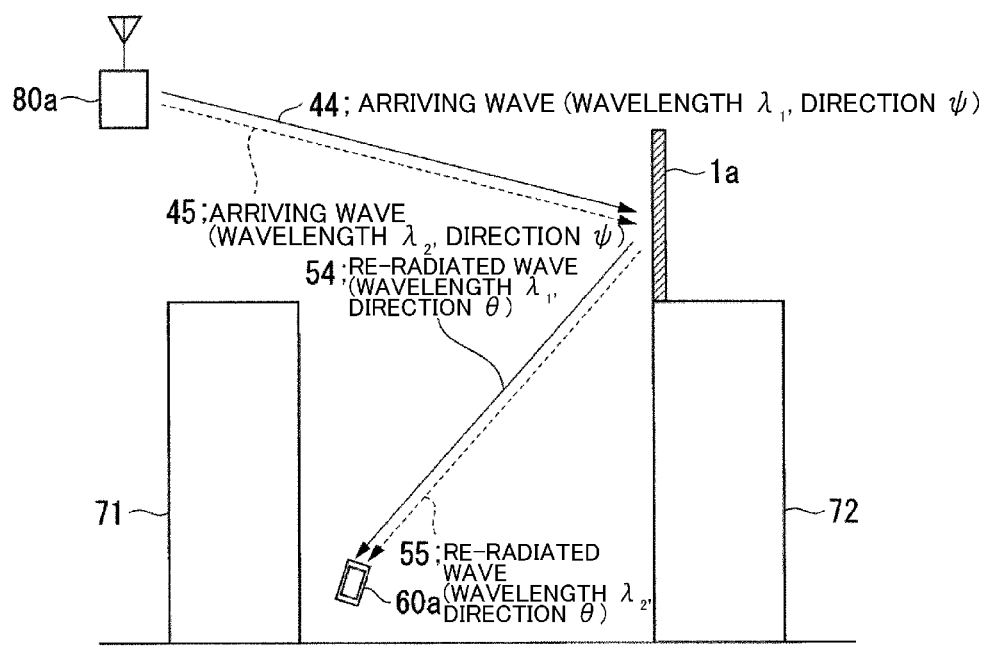
FIG. 11 is a diagram illustrating wireless relay from a single arrival direction to a single re-radiation direction when a plurality of wavelengths are present, according to the second embodiment.

Assume, for example, that the relay device 1 of the second embodiment is applied to a hidden environment such as that illustrated in FIG. 11. In FIG. 11, a terminal device 60a is surrounded by two structures 71 and 72, and is therefore located in a place where it is difficult for radio waves from a base station device 80a to reach. The relay device 1a is installed on the structure 72.

The base station device 80a radiates wireless signal radio waves of a wavelength $\lambda_1$ and a wavelength $\lambda_2$ in the same direction. The wavelength $\lambda_1$ and the wavelength $\lambda_2$ are different wavelengths. Assume that the re-radiation direction $\theta$ is set in advance as the re-radiation direction for both the wavelength $\lambda_1$ and the wavelength $\lambda_2$.

Assume that an arriving wave 44 of the wavelength $\lambda_1$, radiated from the base station device 80a, has reached the relay device 1a at the arrival direction $\psi$. In step Sa1, the filter units 22-1-1, 22-2-1, and 22-3-1 of the phase adjustment units 13a-1, 13a-2 and 13a-3 of the relay device 1a extract the signal of the wavelength $\lambda_1$, and output the extracted signal of the wavelength $\lambda_1$ to the phase control unit 14a and to the phase rotation units 20a-1-1, 20a-2-1, and 20a-3-1 respectively connected thereto.

In step Sa2, using the following Equation (27), the phase control unit 14a calculates the phase adjustment amount $\delta_1$ for the phase rotation unit 20a-1-1, on the basis of the re-radiation direction $\theta$ corresponding to the wavelength $\lambda_1$ and the arrival direction $\psi$.

[Math. 27]

$$\delta_1 = \frac{2\pi d}{\lambda_1}(\sin\theta - \sin\psi) \tag{27}$$

The phase control unit 14a calculates the phase adjustment amounts $2\delta_1$ and $3\delta_1$ for each of the phase rotation units 20a-2-1 and 20a-3-1, taking into account the phase difference with the signal transmitted by the wire connection 12-1, which is the reference wire connection. The phase rotation units 20a-1-1, 20a-2-1, and 20a-3-1 apply phase rotation to the signals of the wavelength $\lambda_1$ output by the filter units 22-1-1, 22-2-1, and 22-3-1 respectively connected thereto, on the basis of the phase adjustment amounts $\delta_1$, $2\delta_1$, and $3\delta_1$ calculated by the phase control unit 14a. Through this, for the wireless signal of the wavelength $\lambda_1$, a re-radiated wave 54 is radiated in the direction of the re-radiation direction $\theta$, and the terminal device 60a can receive the re-radiated wave 52.

On the other hand, assume that an arriving wave 45 of the wavelength $\lambda_2$, radiated from the base station device 80a, has reached the relay device 1a at the arrival direction $\psi$. In step Sa1, the filter units 22-1-2, 22-2-2, and 22-3-2 of the phase adjustment units 13a-1, 13a-2 and 13a-3 of the relay device 1a extract the signal of the wavelength $\lambda_2$, and output the extracted signal of the wavelength $\lambda_2$ to the phase control unit 14a and to the phase rotation units 20a-1-2, 20a-2-2, and 20a-3-2 respectively connected thereto.

In step Sa2, using the following Equation (28), the phase control unit 14a calculates the phase adjustment amount $\delta 2$ for the phase rotation unit 20a-1-2, on the basis of the re-radiation direction $\theta$ corresponding to the wavelength $\lambda_2$ and the arrival direction $\psi$.

[Math. 28]

$$\delta_2 = \frac{2\pi d}{\lambda_2}(\sin\theta - \sin\psi) \tag{28}$$

The phase control unit 14a calculates the phase adjustment amounts $2\delta 2$ and $3\delta 2$ for each of the phase rotation units 20a-2-2 and 20a-3-2, taking into account the phase difference with the signal transmitted by the wire connection 12-1, which is the reference wire connection. The phase rotation units 20a-1-2, 20a-2-2, and 20a-3-2 apply phase rotation to the signals of the wavelength $\lambda_2$ output by the filter units 22-1-2, 22-2-2, and 22-3-2 respectively connected thereto, on the basis of the phase adjustment amounts $\delta 2$, $2\delta 2$, and $3\delta 2$ calculated by the phase control unit 14a. Through this, for the wireless signal of the wavelength $\lambda_2$, a re-radiated wave 55 is radiated in the direction of the re-radiation direction θ, and the terminal device 60a can receive the re-radiated wave 55.

In this manner, wireless signal radio waves of two different wavelengths $\lambda_1$ and $\lambda_2$ can be related and re-radiated in the same re-radiation direction θ.

(Wireless Relay in which Arrival Direction and Re-Radiation Direction Can Be Reversed when Plurality of Wavelengths Present)

Figure 12:
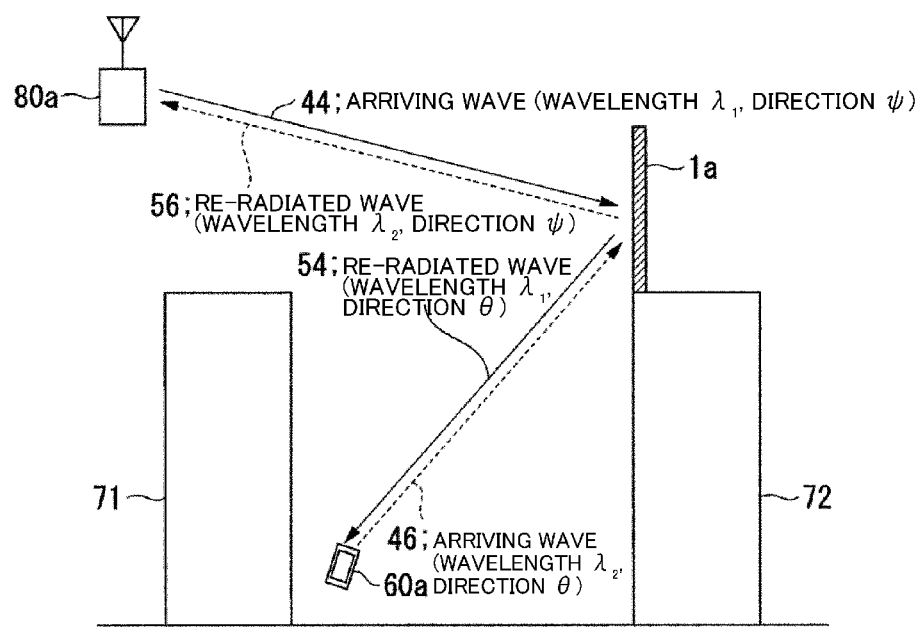
FIG. 12 is a diagram illustrating wireless relay in which the arrival direction and the re-radiation direction can be reversed when a plurality of wavelengths are present, according to the second embodiment.

Assume, for example, that the relay device 1 of the second embodiment is applied to a hidden environment such as that illustrated in FIG. 12. In FIG. 12, the terminal device 60a is surrounded by the two structures 71 and 72, and is therefore located in a place where it is difficult for radio waves from the base station device 80a to reach. The relay device 1a is installed on the structure 72. Assume that the relay device 1a transmits and receives wireless signals between the base station device 80a and the terminal device 60a through Frequency Division Duplex (FDD).

The base station device 80a radiates wireless signal radio waves of the wavelength $\lambda_1$. On the other hand, the terminal device 60a radiates wireless signal radio waves of the wavelength $\lambda_2$. The wavelength $\lambda_1$ and the wavelength $\lambda_2$ are different wavelengths. Assume that the re-radiation direction θ is set in advance as the re-radiation direction for the wavelength $\lambda_1$. Assume that the re-radiation direction ψ is set in advance as the re-radiation direction for the wavelength $\lambda_2$.

Assume that an arriving wave 44 of the wavelength $\lambda_1$, radiated from the base station device 80a, has reached the relay device 1a at the arrival direction ψ. In this case, the relay device 1a performs the same processing as in the case when the arriving wave 44 has arrived, described with reference to FIG. 11; for the wireless signal of the wavelength $\lambda_1$, the re-radiated wave 54 is radiated in the direction of the re-radiation direction θ, and the terminal device 60a can receive the re-radiated wave 54.

On the other hand, assume that an arriving wave 46 of the wavelength $\lambda_2$, radiated from the terminal device 60a, has reached the relay device 1a at the arrival direction G. In step Sa1, the filter units 22-1-2, 22-2-2, and 22-3-2 of the phase adjustment units 13a-1, 13a-2 and 13a-3 of the relay device 1a extract the signal of the wavelength $\lambda_2$, and output the extracted signal of the wavelength $\lambda_2$ to the phase control unit 14a and to the phase rotation units 20a-1-2, 20a-2-2, and 20a-3-2 respectively connected thereto.

In step Sa2, using the following Equation (29), the phase control unit 14a calculates the phase adjustment amount δ2 for the phase rotation unit 20a-1-2, on the basis of the re-radiation direction ψ corresponding to the wavelength $\lambda_2$ and the arrival direction θ.

[Math. 29]

$$\delta_2 = \frac{2\pi d}{\lambda_2}(\sin \psi - \sin \theta) \quad (29)$$

The phase control unit 14a calculates the phase adjustment amounts 2δ2 and 3δ2 for each of the phase rotation units 20a-2-2 and 20a-3-2, taking into account the phase difference with the signal transmitted by the wire connection 12-1, which is the reference wire connection. The phase rotation units 20a-1-2, 20a-2-2, and 20a-3-2 apply phase rotation to the signals of the wavelength $\lambda_2$ output by the filter units 22-1-2, 22-2-2, and 22-3-2 respectively connected thereto, on the basis of the phase adjustment amounts δ2, 2δ2, and 3δ2 calculated by the phase control unit 14a. Through this, for the wireless signal of the wavelength $\lambda_2$, a re-radiated wave 56 is radiated in the direction of the re-radiation direction ψ, and the base station device 80a can receive the re-radiated wave 56.

In this manner, the direction of radio waves radiated by the base station device 80a and reaching the terminal device 60a, and the direction of radio waves radiated by the terminal device 60a and reaching the base station device 80a, can be reversed, and wireless signals can be transmitted and received between the base station device 80a and the terminal device 60a.

(Wireless Relay from Plurality of Arrival Directions to Plurality of Re-Radiation Directions when Plurality of Wavelengths Present)

Figure 13:
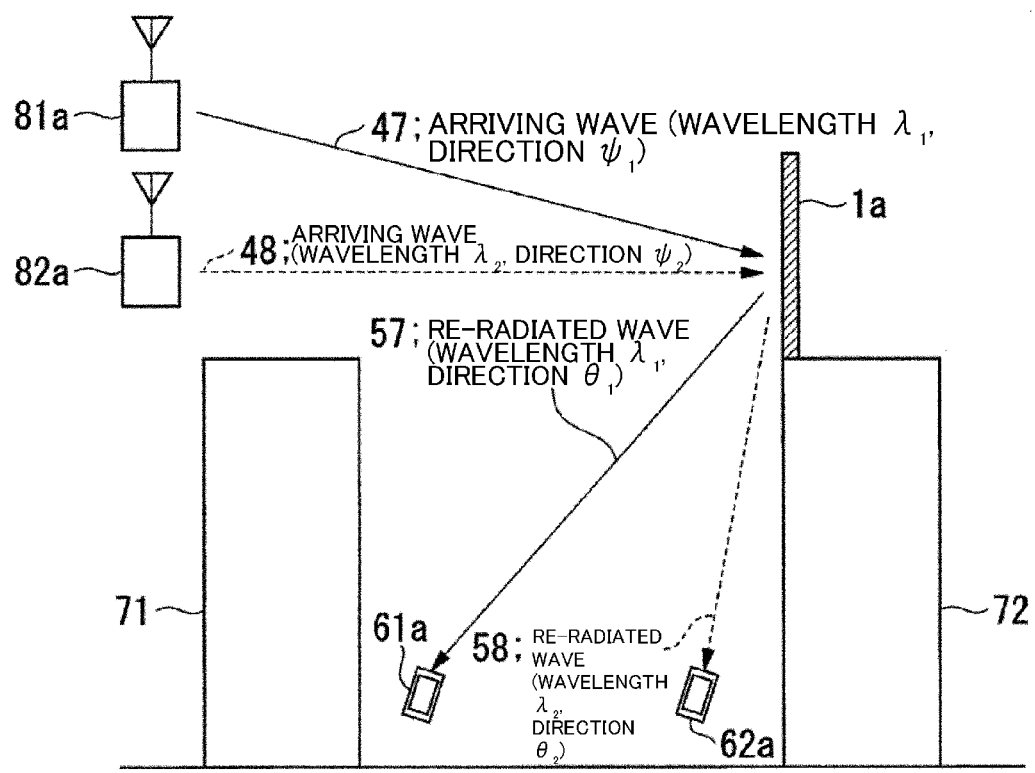
FIG. 13 is a diagram illustrating wireless relay from a plurality of arrival directions to a plurality of re-radiation directions when a plurality of wavelengths are present, according to the second embodiment.
Figure 14:
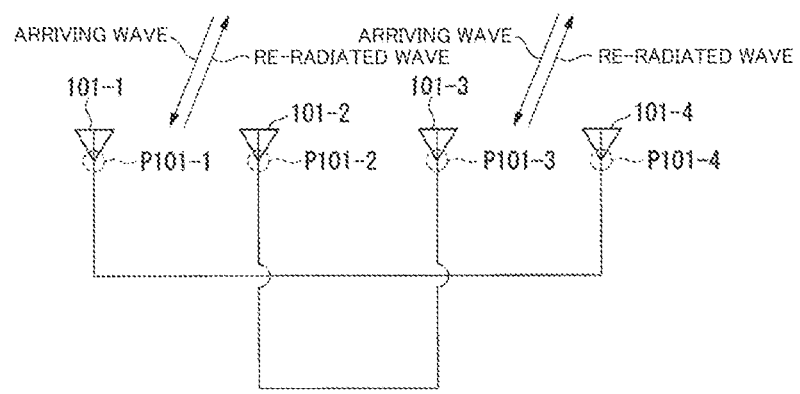
FIG. 14 is a diagram illustrating the configuration of a four-element Van Atta array.

Assume, for example, that the relay device 1 of the second embodiment is applied to a hidden environment such as that illustrated in FIG. 13. In FIG. 13, two terminal devices 61a and 62a are surrounded by the two structures 71 and 72, and are therefore located in a place where it is difficult for radio waves from base station devices 81a and 82a to reach. The relay device 1a is installed on the structure 72. Here, assume the base station device 81a transmits the wireless signal toward the terminal device 61a, and the base station device 82a transmits the wireless signal to the terminal device 62a.

The base station device 81a radiates wireless signal radio waves of the wavelength $\lambda_1$. The base station device 82a radiates wireless signal radio waves of the wavelength $\lambda_2$. The wavelength $\lambda_1$ and the wavelength $\lambda_2$ are different wavelengths. Assume that the re-radiation direction $\theta_1$ is set in advance as the re-radiation direction for the wavelength $\lambda_1$. Assume that the re-radiation direction $\theta_2$ is set in advance as the re-radiation direction for the wavelength $\lambda_2$.

Assume that an arriving wave 47 of the wavelength $\lambda_1$, radiated from the base station device 81a, has reached the relay device 1a at the arrival direction $\psi_i$. In step Sa1, the filter units 22-1-1, 22-2-1, and 22-3-1 of the phase adjustment units 13a-1, 13a-2 and 13a-3 of the relay device 1a extract the signal of the wavelength $\lambda_1$, and output the extracted signal of the wavelength $\lambda_1$ to the phase control unit 14a and to the phase rotation units 20a-1-1, 20a-2-1, and 20a-3-1 respectively connected thereto.

In step Sa2, using the following Equation (30), the phase control unit 14a calculates the phase adjustment amount $\delta_1$ for the phase rotation unit 20a-1-1, on the basis of the re-radiation direction $\theta_1$ corresponding to the wavelength $\lambda_1$ and the arrival direction $\psi_1$.

[Math. 30]

$$\delta_1 = \frac{2\pi d}{\lambda_1}(\sin \theta_1 - \sin \psi_1) \quad (30)$$

The phase control unit 14a calculates the phase adjustment amounts $2\delta_1$ and $3\delta_1$ for each of the phase rotation units 20a-2-1 and 20a-3-1, taking into account the phase difference with the signal transmitted by the wire connection 12-1, which is the reference wire connection. The phase rotation units 20a-1-1, 20a-2-1, and 20a-3-1 apply phase rotation to the signals of the wavelength $\lambda_1$ output by the filter units 22-1-1, 22-2-1, and 22-3-1 respectively connected thereto, on the basis of the phase adjustment amounts $\delta_1$, $2\delta_1$, and $3\delta_1$ calculated by the phase control unit 14a. Through this, for the wireless signal of the wavelength $\lambda_1$, a re-radiated wave 57 is radiated in the direction of the re-radiation direction $\theta_1$, and the terminal device 61a can receive the re-radiated wave 57.

On the other hand, assume that an arriving wave 48 of the wavelength $\lambda_2$, radiated from the base station device 82a, has reached the relay device 1a at the arrival direction $\psi2$ In step Sa1, the filter units 22-1-2, 22-2-2, and 22-3-2 of the phase adjustment units 13a-1, 13a-2, and 13a-3 of the relay device 1a extract the signal of the wavelength $\lambda_2$, and output the extracted signal of the wavelength $\lambda_2$ to the phase control unit 14a and to the phase rotation units 20a-1-2, 20a-2-2, and 20a-3-2 respectively connected thereto.

In step Sa2, using the following Equation (31), the phase control unit 14a calculates the phase adjustment amount $\delta 2$ for the phase rotation unit 20a-1-2, on the basis of the re-radiation direction $\theta_2$ corresponding to the wavelength $\lambda_2$ and the arrival direction $\psi_2$.

[Math. 31]

$$\delta_2 = \frac{2\pi d}{\lambda_2}(\sin\theta_2 - \sin\psi_2) \tag{31}$$

The phase control unit 14a calculates the phase adjustment amounts $2\delta 2$ and $3\delta 2$ for each of the phase rotation units 20a-2-2 and 20a-3-2, taking into account the phase difference with the signal transmitted by the wire connection 12-1, which is the reference wire connection. The phase rotation units 20a-1-2, 20a-2-2, and 20a-3-2 apply phase rotation to the signals of the wavelength $\lambda_2$ output by the filter units 22-1-2, 22-2-2, and 22-3-2 respectively connected thereto, on the basis of the phase adjustment amounts $\delta 2$, $2\delta 2$, and $3\delta 2$ calculated by the phase control unit 14a. Through this, for the wireless signal of the wavelength $\lambda_2$, a re-radiated wave 58 is radiated in the direction of the re-radiation direction $\theta_2$, and the terminal device 62a can receive the re-radiated wave 58.

In the above-described second embodiment, when the wireless signal is transmitted at a plurality of wavelengths, the phase control unit 14a calculates, for each of the wire connections aside from the reference wire connection, the phase adjustment amount for each of different wavelengths received by one of the antenna elements on the basis of the arrival direction of the wireless signal of the wavelength and a re-radiation direction of a wireless signal of the wavelength transmitted as a re-radiated wave by the other of the antenna elements, taking into account a phase difference between signals of the wavelength transmitted by the wire connections connected to the one of the antenna elements and a signal of the wavelength transmitted by the reference wire connection. The phase adjustment units 13a-1, 13a-2 and 13a-3 separate the signals transmitted by the wire connections into each of the wavelengths, and apply phase rotation to the phase of the signal of each of the wavelength obtained by the separating, in accordance with the phase adjustment amount corresponding to each of the wavelengths.

Through this, the phase adjustment amounts of the phase adjustment units 13a-1, 13a-2, and 13a-3 can be changed dynamically by the phase control unit 14a, and thus wireless relay can be realized which, when radio waves have different wavelengths, uses an array antenna to radiate a radio wave arriving from a given arrival direction in a re-radiation direction pre-set for each of the wavelengths.

Note that the foregoing first and second embodiments also assume a case where the strengths of the signals in the wire connections 15-1 to 15-4, the wire connections 12-1 to 12-4, and the phase adjustment units 13-1 to 13-3 and 13a-1 to 13a-3 connected between the antenna elements 10-1 to 10-4 are attenuated, and the radio waves cannot be relayed to the terminal devices 60, 61, 62, 60a, 61a, and 62a at a sufficient gain. In such a case, an amplifier or the like may be inserted at any of the locations of the wire connections 15-1 to 15-4 and the wire connections 12-1 to 12-4 to amplify the strength of the wireless signal radio waves to be relayed.

It is also known that, in general, as the number of antenna elements in an array antenna decreases, the beam grows wider, whereas as the number of antenna elements increases, the beam grows sharper. Accordingly, in the configurations of the first and second embodiments as well, adjusting the number of the antenna elements 10-1 to 10-4 makes it possible to adjust the size of the service area to which wireless signals are relayed. A smaller number of antenna elements will result in a small gain as well, but in that case, an amplifier or the like may be inserted to amplify the radio waves as described above.

Additionally, in the examples of FIG. 1 in the foregoing first embodiment and FIG. 8 in the foregoing second embodiment, a four-element Van Atta array with a linear array antenna arrangement is illustrated as an example, but the number of antenna elements is not limited to four, and may be any number as long as it is even. The array is not limited to a linear array antenna, and may be a planar array antenna.

Additionally, although the wire connection 12-1 in the path transmitting the signal from the antenna element 10-1 to the antenna element 10-4 is used as the reference wire connection in the above-described configurations of the first and second embodiments, another path may be used as the reference wire connection. For example, the wire connection 12-3 in the path transmitting a signal from the antenna element 10-2 to the antenna element 10-3 may be used as the reference wire connection.

In this case, the phase adjustment units 13-1 and 13a-1 are not provided between the wire connection 12-3L and the wire connection 12-3R, and the wire connection 12-3L and the wire connection 12-3R are connected such that a length from a position P10-2 to a position P10-3 is L. On the other hand, the wire connection 12-1 is, for example, divided into a wire connection 12-1L and a wire connection 12-1R, and a phase adjustment unit is inserted between the wire connection 12-1L and the wire connection 12-1R. For the sake of description, the inserted phase adjustment unit will be called a phase adjustment unit 13-4 or 13a-4. Note that the phase adjustment units 13-4 and 13a-4 are inserted in such a manner that after the phase adjustment units 13-4 and 13a-4 are inserted, the distance of the path from the connection point P10-1 to the connection point P10-4 via the wire connection 15-1, the circulator 11-1, the wire connection 12-1L, the phase adjustment units 13-4 and 13a-4, the wire connection 12-1R, the circulator 11-4, and the wire connection 15-4 is L.

In this case, the phase differences between the signal transmitted by the wire connection 12-3, which serves as the reference wire connection, and the signals transmitted by the wire connection 12-1L, the wire connection 12-4R, and the wire connection 12-2R, are $-\tau$, $\tau$, and $2\tau$ in the first embodiment and $-\tau_i$, $\tau_i$, and $2\tau_i$ in the second embodiment. When calculating the phase adjustment amounts for the phase adjustment units 13-2 to 13-4 and 13a-2 to 13a-4, the phase control units 14 and 14a perform the calculation taking into account the phase differences with the signal transmitted by the wire connection 12-3, which serves as the reference wire connection.

Additionally, a configuration in which the phase control units 14 and 14*a* determine the phase adjustment amounts on the basis of the "phase difference with the signal transmitted by the reference wire connection" has been described here. However, if the wire connection set as the reference wire connection is already known, the wire connection where phase rotation at nδ is to be performed is also already known. As such, the phase control units 14 and 14*a* may be configured to determine the phase adjustment amount on the basis of a "wire connection number".

Additionally, the above-described configuration of the first embodiment may be combined with the configuration of the second embodiment. This combination makes it possible to re-radiate, in a given direction, a wireless signal radio wave of a given wavelength arriving from a given arrival direction.

The relay devices 1 and 1*a* in the foregoing embodiments may be implemented by a computer. In this case, a program for implementing these functions may be recorded in a computer-readable recording medium, and the functions may be implemented by loading the program recorded in the recording medium into a computer system and executing the program. Here, "computer system" is assumed to include an OS, hardware such as peripheral devices, and the like. Additionally, "computer-readable recording medium" refers to a portable medium such as a flexible disk, a magneto-optical disk, ROM, a CD-ROM, or the like, or a storage device such as a hard disk which is built into the computer system. Furthermore, the "computer-readable recording medium" may also include a medium which holds the program for a set length of time, e.g., a medium that holds a program dynamically for a short period of time, such as a communication line in the case of transmitting a program over a network such as the Internet or a communication line such as a telephone line, or volatile memory within the computer system that serves as a server or client in such a case. The stated program may implement only some of the above-described functions, and may further be capable of implementing the above-described functions in combination with programs already recorded in the computer system, or may be implemented using a programmable logic device such as an FPGA (Field Programmable Gate Array).

Although embodiments of this invention have been described in detail above with reference to the drawings, the specific configuration is not limited to the embodiment, and designs and the like within the scope of the present invention are included.

INDUSTRIAL APPLICABILITY

The present invention can be applied in a variety of wireless systems such as mobile and wireless LAN (local Area Network), and in wireless communication in a variety of frequency bands.

REFERENCE SIGNS LIST

1 Relay device
10-1 to 10-4 Antenna element
11-1 to 11-4 Circulator
13-1 to 13-3 Phase adjustment unit
14 Phase control unit
12-1 to 12-4, 15-1 to 15-4 Wire connection

The invention claimed is:

1. A relay device comprising:
    an array antenna in which a spacing between adjacent ones of antenna elements is constant, each of combinations of two of the antenna elements in positions symmetrical relative to a center of an array is connected by wire connections in two paths, and a path length between the antenna elements in the combination of two antenna elements is the same in all of the combinations;
    a phase control unit that, when any one of the wire connections is predefined as a reference wire connection serving as a reference, calculates a phase adjustment amount for each of the wire connections aside from the reference wire connection on the basis of an arrival direction of a wireless signal received by one of the antenna elements in the combination of two antenna elements and a re-radiation direction of a wireless signal transmitted as a re-radiated wave by another of the antenna elements corresponding to the one of the antenna elements;
    wherein the wireless signal contains a plurality of frames that are time-divided, and the phase control unit calculates, for each of the wire connections aside from the reference wire connection, the phase adjustment amount for each of the frames contained in the wireless signal received by the one of the antenna elements, on the basis of an arrival direction of the wireless signal containing the frame and a re-radiation direction of the wireless signal containing the frame, taking into account the phase difference between the signal transmitted by the wire connections connected to the one of the antenna elements and the signal transmitted by the reference wire connection; and
    a phase adjustment unit, provided for each of the wire connections aside from the reference wire connection, that applies phase rotation to the signal transmitted by the wire connection in accordance with the phase adjustment amount calculated by the phase control unit, wherein the phase adjustment unit detects the frame from the signal transmitted by the wire connection, and applies phase rotation to the phase of the detected frame in accordance with the phase adjustment amount corresponding to the detected frame.

2. The relay device according to claim 1,
    wherein the frame contains data indicating a source or data indicating a destination, and
    the phase control unit calculates a re-radiation direction of the wireless signal containing the frame on the basis of the data indicating the source or the data indicating the destination contained in the frame.

3. A relay method using an array antenna in which a spacing between adjacent ones of antenna elements is constant, each of combinations of two of the antenna elements in positions symmetrical relative to a center of an array is connected by wire connections in two paths, and a path length between the antenna elements in the combination of two antenna elements is the same in all of the combinations, the method comprising:
    a phase adjustment amount calculation step of, when any one of the wire connections is predefined as a reference wire connection serving as a reference, calculating a phase adjustment amount for each of the wire connections aside from the reference wire connection on the basis of an arrival direction of a wireless signal received by one of the antenna elements in the combination of two antenna elements and a re-radiation direction of a wireless signal transmitted as a re-radiated wave by another of the antenna elements corresponding to the one of the antenna elements, taking into account a phase difference between a signal transmitted by the wire connections connected to the one of the antenna elements and a signal transmitted by the reference wire connection; and a phase adjustment step of, for each of the wire connections aside from the reference wire connection, applying phase rotation to the signal transmitted by the wire connection in accordance with the phase adjustment amount calculated in the phase adjustment amount calculation step;

wherein the wireless signal is transmitted at a plurality of wavelengths, the phase adjustment amount calculation step calculates, for each of the wire connections aside from the reference wire connection, the phase adjustment amount for each of different wavelengths received by the one of the antenna elements on the basis of an arrival direction of the wireless signal of the wavelength and a re-radiation direction of a wireless signal of the wavelength transmitted as a re-radiated wave by the other of the antenna elements, taking into account a phase difference between signals of the wavelength transmitted by the wire connections connected to the one of the antenna elements and a signal of the wavelength transmitted by the reference wire connection, and the phase adjustment step separates the signals transmitted by the wire connections into each of the wavelengths, and applies phase rotation to the phase of the signal of each of the wavelength obtained by the separating, in accordance with the phase adjustment amount corresponding to each of the wavelengths.

4. A relay device comprising:

an array antenna in which a spacing between adjacent ones of antenna elements is constant, each of combinations of two of the antenna elements in positions symmetrical relative to a center of an array is connected by wire connections in two paths, and a path length between the antenna elements in the combination of two antenna elements is the same in all of the combinations;

a phase control unit that, when any one of the wire connections is predefined as a reference wire connection serving as a reference, calculates a phase adjustment amount for each of the wire connections aside from the reference wire connection on the basis of an arrival direction of a wireless signal received by one of the antenna elements in the combination of two antenna elements and a re-radiation direction of a wireless signal transmitted as a re-radiated wave by another of the antenna elements corresponding to the one of the antenna elements, taking into account a phase difference between a signal transmitted by the wire connections connected to the one of the antenna elements and a signal transmitted by the reference wire connection;

a phase adjustment unit, provided for each of the wire connections aside from the reference wire connection, that applies phase rotation to the signal transmitted by the wire connection in accordance with the phase adjustment amount calculated by the phase control unitwherein the wireless signal is transmitted at a plurality of wavelengths, and the phase control unit calculates, for each of the wire connections aside from the reference wire connection, the phase adjustment amount for each of different wavelengths received by the one of the antenna elements on the basis of an arrival direction of the wireless signal of the wavelength and a re-radiation direction of a wireless signal of the wavelength transmitted as a re-radiated wave by the other of the antenna elements, taking into account a phase difference between signals of the wavelength transmitted by the wire connections connected to the one of the antenna elements and a signal of the wavelength transmitted by the reference wire connection, and a phase adjustment unit, provided for each of the wire connections aside from the reference wire connection, that applies phase rotation to the signal transmitted by the wire connection in accordance with the phase adjustment amount calculated by the phase control unit, wherein the phase adjustment unit separates the signals transmitted by the wire connections into each of the wavelengths, and applies phase rotation to the phase of the signal of each of the wavelength obtained by the separating, in accordance with the phase adjustment amount corresponding to each of the wavelengths.

5. A relay method using an array antenna in which a spacing between adjacent ones of antenna elements is constant, each of combinations of two of the antenna elements in positions symmetrical relative to a center of an array is connected by wire connections in two paths, and a path length between the antenna elements in the combination of two antenna elements is the same in all of the combinations, the method comprising:

a phase adjustment amount calculation step of, when any one of the wire connections is predefined as a reference wire connection serving as a reference, calculating a phase adjustment amount for each of the wire connections aside from the reference wire connection on the basis of an arrival direction of a wireless signal received by one of the antenna elements in the combination of two antenna elements and a re-radiation direction of a wireless signal transmitted as a re-radiated wave by another of the antenna elements corresponding to the one of the antenna elements, taking into account a phase difference between a signal transmitted by the wire connections connected to the one of the antenna elements and a signal transmitted by the reference wire connection; and a phase adjustment step of, for each of the wire connections aside from the reference wire connection, applying phase rotation to the signal transmitted by the wire connection in accordance with the phase adjustment amount calculated in the phase adjustment amount calculation step, wherein the wireless signal contains a plurality of frames that are time-divided, the phase adjustment amount calculation step calculates, for each of the wire connections aside from the reference wire connection, the phase adjustment amount for each of the frames contained in the wireless signal received by the one of the antenna elements, on the basis of an arrival direction of the wireless signal containing the frame and a re-radiation direction of the wireless signal containing the frame, taking into account the phase difference between the signal transmitted by the wire connections connected to the one of the antenna elements and the signal transmitted by the reference wire connection, and the phase adjustment step detects the frame from the signal transmitted by the wire connection, and applies phase rotation to the phase of the detected frame in accordance with the phase adjustment amount corresponding to the detected frame.

* * * * *